United States Patent
Lv et al.

(10) Patent No.: US 11,025,952 B2
(45) Date of Patent: Jun. 1, 2021

(54) VIDEO ENCODING/DECODING METHOD AND DEVICE

(71) Applicant: HUAWEI TECHNOLOGIES CO., LTD., Guangdong (CN)

(72) Inventors: Zhuoyi Lv, Shenzhen (CN); Haitao Yang, Shenzhen (CN); Wenyi Qiu, Shenzhen (CN); Dongsheng Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 16/193,954

(22) Filed: Nov. 16, 2018

(65) Prior Publication Data

US 2019/0089981 A1    Mar. 21, 2019

Related U.S. Application Data

(63) Continuation of application No. PCT/CN2016/101262, filed on Sep. 30, 2016.

(30) Foreign Application Priority Data

May 17, 2016  (CN) .......................... 201610332887.3

(51) Int. Cl.
*H04N 19/58*    (2014.01)
*H04N 19/107*   (2014.01)
(Continued)

(52) U.S. Cl.
CPC .......... *H04N 19/58* (2014.11); *H04N 19/107* (2014.11); *H04N 19/137* (2014.11);
(Continued)

(58) Field of Classification Search
CPC .............................. H04N 19/23; H04N 19/46
See application file for complete search history.

(56) References Cited

U.S. PATENT DOCUMENTS

2003/0012277 A1   1/2003   Azuma et al.
2008/0123747 A1*  5/2008   Lee ........................ H04N 19/20
                                                         375/240.16
(Continued)

FOREIGN PATENT DOCUMENTS

CN        1395231 A      2/2003
CN      101742319 A      6/2010
(Continued)

OTHER PUBLICATIONS

Office Action issued in Chinese Application No. 201610332887.3 dated Jul. 25, 2019, 14 pages.
(Continued)

*Primary Examiner* — Boubacar Abdou Tchoussou
(74) *Attorney, Agent, or Firm* — Fish & Richardson P.C.

(57) ABSTRACT

Methods, devices, apparatus, and systems for video encoding/decoding in which usage of a background picture is synchronized on an encoder side and a decoder side. In this solution, a background picture that is to be used as a reference picture is determined, background-picture indication information is used to indicate a time point from which the background picture is used as the reference picture, the encoder side encodes to-be-coded video pictures by using the background picture as the reference picture from the time point indicated by the background-picture indication information, to generate a primary bitstream, and the encoder side transmits a background-picture bitstream, the background-picture indication information, and the primary bitstream to the decoder side.

16 Claims, 9 Drawing Sheets

(51) Int. Cl.
*H04N 19/23* (2014.01)
*H04N 19/179* (2014.01)
*H04N 19/137* (2014.01)
*H04N 19/44* (2014.01)
*H04N 19/46* (2014.01)

(52) U.S. Cl.
CPC .......... *H04N 19/179* (2014.11); *H04N 19/23* (2014.11); *H04N 19/44* (2014.11); *H04N 19/46* (2014.11)

(56) References Cited

U.S. PATENT DOCUMENTS

| | | | | |
|---|---|---|---|---|
| 2010/0061461 | A1* | 3/2010 | Bankoski | H04N 19/105 375/240.16 |
| 2012/0169923 | A1* | 7/2012 | Millar | H04N 19/61 348/399.1 |
| 2015/0271356 | A1 | 9/2015 | Terada et al. | |
| 2016/0134882 | A1* | 5/2016 | Davies | H04N 19/23 375/240.12 |
| 2016/0142715 | A1* | 5/2016 | Tanizawa | H04N 19/23 375/240.12 |
| 2016/0150242 | A1* | 5/2016 | Zhang | H04N 19/46 375/240.12 |
| 2017/0105004 | A1* | 4/2017 | Chen | H04N 19/176 |

FOREIGN PATENT DOCUMENTS

| | | |
|---|---|---|
| CN | 101883284 A | 11/2010 |
| CN | 104253996 A | 12/2014 |
| CN | 104717511 A | 6/2015 |
| CN | 104967855 A | 10/2015 |
| JP | 2015180038 A | 10/2015 |

OTHER PUBLICATIONS

Search Report issued in Chinese Application No. 201610332887.3 dated Jun. 25, 2019, 3 pages.
ITU-T H.263 Implementors' Guide, Series H: Audiovisual and Multimedia Systems Coding of moving video Implementors Guide for 11.263: "Video coding for low bit rate communication". Aug. 5, 2005, 10 pages.
ITU-T H.264 Series H: Audiovisual and Multimedia Systems Infrastructure of audiovisual services—Coding of moving video Advanced video coding for generic audiovisual services. Feb. 2016, 807 pages.
ITU-T H.265 Series H: Audiovisual and Multimedia Systems Infrastructure of audiovisual services—Coding of moving video High efficiency video coding. Apr. 2015, 634 pages.
International Search Report and Written Opinion issued in International Application No. PCT/CN2016/101262 dated Jan. 25, 2017, 17 pages.
Xianguo Zhang et al: "An efficient coding scheme for surveillance videos captured by stationary cameras", Visual Communications and Image Processing; Jul. 11, 2010-Jul. 14, 2010; Huang Shan, An Hui, China , Jul. 11, 2010, XP030082230, 10 pages.
Wen Gao et al: "Scene Video Coding" In:"Advanced Video Coding Systems", Jan. 1, 2014, Springer International Publishing, Cham, XP055324771, 26 pages.
Zhang Xianguo et al: "Background-Modeling-Based Adaptive Prediction for Surveillance Video Coding",!EEE Transactions on Image Processing, IEEE Service Center, Piscataway, NJ, US, vol. 23, No. 2, Feb. 1, 2014, pp. 769-784,XP011536818.
Xianguo Zhang (Peking Univ et al: "A Background Model Based Method for Transcoding Surveillance Videos Captured by Stationary Camera", Picture Coding Symposium 2010; Aug. 12, 2010-Jan. 12, 2010; Nagoya, Dec. 8, 2010, XP030081933, 4 pages.
Extended European Search Report issued in European Application No. 16902208.4 dated Feb. 11, 2019, 11 pages.

* cited by examiner

VIDEO ENCODING/DECODING METHOD AND DEVICE

CROSS-REFERENCE TO RELATED APPLICATIONS

This application is a continuation of International Application No. PCT/CN2016/101262, filed on Sep. 30, 2016, which claims priority to Chinese Patent Application No. 201610332887.3, filed on May 17, 2016. The disclosures of the aforementioned applications are hereby incorporated by reference in their entireties.

TECHNICAL FIELD

The present disclosure relates to the video encoding/decoding and compression field, and in particular, to a reference picture coding technology.

BACKGROUND

Video encoding/decoding technologies are widely applied to apparatuses with a digital video capacity, such as a digital television, a digital live broadcast system, a radio broadcast system, a personal digital assistant (PDA), a laptop or desktop computer, a tablet computer, an e-book reader, a digital camera, a digital recording apparatus, a digital media player, a video game apparatus, a video game console, a cellular or satellite radio phone, a video conference apparatus, and a video stream apparatus. Common video encoding/decoding technologies include video compression technologies described in standards defined in the MPEG-2, the MPEG-4, the ITU-TH.263, the ITU-TH.264/Advanced Video Coding (AVC) in the tenth part of MPEG-4, and the ITU-TH.265 High Efficiency Video Coding (HEVC) standard and extension parts of the standards, so that digital video information is transmitted or received more effectively. By implementing the video encoding/decoding technologies, the digital video information is transmitted, received, encoded, decoded and/or stored more effectively.

In the video encoding/decoding field, a concept of a frame is a complete picture. After being combined into a video format according to a sequence and a frame rate, the frame pictures can be played. Because a strong time correlation exists between adjacent pictures in a video sequence, each frame of picture in the picture sequence may be divided into several non-overlapping picture blocks, and it is considered that motion vectors of all pixels in a coding block are the same. Motion vectors are allocated by picture block. When inter-frame prediction is performed on a currently coding block in a currently coding picture, a reconstructed coding picture is used as a reference picture. For the currently coding block, a motion search is performed in a search region in the reference picture to find a block that meets a match rule with the currently coding block, and this block is a match block. A relative offset between a spatial position of the currently coding block and that of the match block in the reference picture is a motion vector (MV). A process of obtaining the motion vector is referred to as motion estimation (ME). When compression encoding is performed on a video, reference picture information, motion vector information, and a residual value are encoded and then sent to a decoder side. The residual value is a difference between a reconstruction pixel value of the match block and an original pixel value of the current block. The decoder side finds, from a decoded reference picture, a block in a position to which the motion vector points, and adds the residual value to the block to restore the current block. Inter-frame redundancy in the video sequence may be removed by using motion estimation, so that a quantity of bits in video transmission is greatly reduced.

Mutual blocking between objects, entering of new content, scenario changing, camera moving, or the like may cause that no match block of a current block is found from an adjacent picture; accordingly, a multiple reference picture coding technology is introduced, greatly improving coding performance. As shown in FIG. 1, for a currently coding block in a currently coding picture, a motion search may be separately performed in k coded reference pictures that are before the current picture, to find match blocks.

In the video coding standards such as AVC and HEVC, two types of reference pictures are prescribed: short-term reference picture and long-term reference picture. The short-term reference picture is generally a reconstructed coding picture that is relatively close to the current picture, and an object similar to that in the current picture exists in the short-term reference picture. The long-term reference picture is generally a reconstructed coding picture that is relatively far from the current picture. A reference picture list is used to manage reference pictures. To find a match block for a currently coding block, starting from a first reference picture in the reference picture list, a motion vector having a minimum match error is found in a search region, then the motion search continues in a next reference picture until the motion search is performed in all the reference pictures in the reference picture list, and an optimal motion vector of the currently coding block and a reference picture used by the currently coding block are determined. Generally, a motion vector having a minimum match error is considered as the optimal motion vector.

It is prescribed in the standards that one complete segment video bitstream is one CVS (Coded Video Sequence). One CVS starts with a random access point (Random Access Point) picture, the random access point picture is an intra-frame coding picture, the intra-frame coding picture means that all blocks in the picture are encoded by using intra-frame prediction, and a period in which the random access point picture appears is set by an encoder side. When a CVS is generated through encoding or a CVS is decoded, a DPB (Decoding picture Buffer) is initialized and maintained to store reconstructed coding pictures. These reconstructed pictures may be used as short-term reference pictures and long-term reference pictures, to predict and code a currently coding picture and a subsequent to-be-coded picture. An update operation of a short-term reference frame is usually based on a sliding window mechanism, to control to add a new reconstructed picture and remove an outdated reconstructed picture, while a long-term reference frame may be stored in the DPB for a relative long time. In an encoding/decoding process, when a current picture is a random access point picture, the DPB is emptied, to ensure that a picture before the random access point cannot be referred to by a picture after the random access point.

In the existing video coding solutions, there is a long-term reference mechanism: an important coding picture is stored in a DPB for a long time, to be used as a long-term reference picture for a plurality of subsequent to-be-coded pictures, to perform an inter-frame prediction coding operation. Generally, higher quality of a reference picture means higher efficiency of inter-frame prediction coding. In particular, in application such as monitoring video coding, a background picture is usually used as a long-term reference picture because a background region of video content keeps unchanged for a long time. The background picture may be constructed in a manner such as time-domain mean filtering or Gaussian modeling, or selected from a collected video picture sequence based on a principle such as a minimum motion energy principle. Therefore, a long-term picture is used as reference of a plurality of subsequent pictures and therefore is very important, so that high-quality coding needs to be performed as far as possible, to improve compression efficiency of a complete segment of video content.

It should be noted that, in the existing coding solutions, neither the short-term reference picture nor the long-term reference picture can be used cross random access points. In some application such as monitoring video coding, random access points need to be set at intervals of one second or two seconds; however, an update cycle of an effective long-term reference picture, such as a background picture, is far longer than a random access point cycle. If the background picture is considered to be used as reference, a background-picture compression bitstream needs to be added to all CVSs that are separated by random access point pictures, so as to be transmitted to the decoder side. In consideration of importance of the background picture, high-quality coding is usually performed. This processing manner of performing encoding repeatedly to transmit a high-quality background picture increases additional coding overhears and counteracts most coding gains brought by the high-quality background picture.

In addition, in application such as real-time monitoring, because transmission channel bandwidth is limited, a peak-to-average ratio of 2:1 or 3:1 is usually used to restrain a time-domain fluctuation of a compression bit rate. However, during high-quality coding on the background picture, a compression bitstream has a sharp peak. As shown in FIG. 2, a peak-to-average ratio of the compression bitstream is usually 5:1 or even up to 10:1. In this case, the background-picture bitstream cannot be transmitted to the decoder side in real time because a rate of the background-picture bitstream exceeds a channel transmission capacity. This causes decoding and playback freeze and wait and triggers a frame drop operation. Consequently, watching experience deteriorates and important information is lost.

It can be learned from the foregoing description that, in the existing coding solutions, when a background-picture bitstream rate exceeds an information transmission capacity, a decoder side cannot receive the background-picture bitstream in real time. Consequently, when the decoder side uses a background picture for decoding, the decoder side waits for a background picture, and this causes decoding and playback freeze or wait, triggers a frame drop operation, or the like, thereby affecting user experience.

SUMMARY

To resolve a prior-art problem that decoding and playback freeze and wait and a frame drop operation are caused because a background picture is not obtained in time during decoding by using the background picture, the present disclosure provides a video encoding/decoding method and apparatus, so that usage of a background picture is synchronized on an encoder side and a decoder side.

According to a first aspect of the present disclosure, a video encoding method is provided and is performed by an encoder side, where the method includes: determining a background picture that is to be used as a reference picture, performing encoding processing on the background picture to generate a background-picture bitstream, and transmitting the background-picture bitstream; generating and sending background-picture indication information, where the background-picture indication information is used to indicate a time point from which the background picture is used as the reference picture, encoding to-be-coded video pictures by using the background picture as the reference picture from the time point indicated by the background-picture indication information, to generate a primary bitstream, and transmitting the primary bitstream. In the solution provided in the first aspect of the present disclosure, the time point from which the background picture is used as the reference picture to encode the to-be-coded video pictures is indicated by the background-picture indication information, and the encoder side uses the background picture as the reference picture from the time point indicated by the background-picture indication information, to perform encoding. Therefore, time points at which the encoder side and a decoder side use the reference picture can be synchronized by using the background-picture indication information. Based on the synchronization mechanism, the background-picture bitstream can be flexibly transmitted without following a requirement that transmission of the background-picture bitstream should be completed before processing of a next to-be-coded picture. Accordingly, this avoids freeze and wait and a frame drop operation caused by overload of high-quality background picture transmission.

In a possible implementation in the first aspect of the present disclosure, the primary bitstream includes a random access segment, and during specific implementation, the encoding to-be-coded video pictures by using the background picture as the reference picture from the time point indicated by the background-picture indication information, to generate a primary bitstream may be: using the background picture as a reference picture for one or more random access segments in the primary bitstream from the time point indicated by the background-picture indication information. In this way, the background picture is used as the reference picture from the time point indicated by the background-picture indication information without a need of retransmitting the background picture in each random access segment. In other words, the background picture can be used cross random access points, so that retransmission of the background picture is avoided, and encoding overheads are reduced.

In a possible implementation in the first aspect of the present disclosure, the determining a background picture that is to be used as a reference picture may be: constructing the background picture in a manner such as time-domain mean filtering or Gaussian modeling; or selecting a video picture from a collected video picture sequence based on a principle such as a minimum motion energy principle, as the background picture; or selecting, from a to-be-coded video picture sequence, a video picture that meets a preset rule as the background picture.

In a possible implementation in the first aspect of the present disclosure, the performing compression encoding processing on the background picture to generate a background-picture bitstream may be: independently performing high-quality compression encoding processing on the background picture to obtain a compression bitstream of a high-quality background picture. Picture quality of the high-quality background picture is higher than that of the conventionally-coded background picture; and the encoding to-be-coded video pictures by using the background picture as the reference picture from the time point indicated by the background-picture indication information, to generate a primary bitstream includes: at the time indicated by the background-picture usage delay duration or the time at which the background-picture initial usage flag appears, identifying a corresponding conventionally-coded background picture that is in a DPB (Decoding picture Buffer), and replacing the conventionally-coded background picture with the high-quality background picture, to start to use the high-quality background picture as the reference picture to encode the to-be-coded video pictures. The high-quality compression encoding processing means that a suitable encoder parameter, such as a relatively high target bit rate or a relatively small quantization parameter, is selected to perform encoding processing on a to-be-coded picture, so as to obtain a coded reconstructed picture that is more approximate to an original un-coding picture than a conventionally-coded reconstructed picture.

In a possible implementation in the first aspect of the present disclosure, the encoding to-be-coded video pictures by using the background picture as the reference picture from the time point indicated by the background-picture indication information, to generate a primary bitstream includes: encoding the to-be-coded video pictures by using the background picture as the reference picture from the time point indicated by the background-picture indication information, to obtain coding pictures; and setting a background-picture reference flag in header information of the coding pictures, where the background-picture reference flag is used to identify whether the background picture is used as a reference picture for a currently coding picture.

According to a second aspect of the present disclosure, a video decoding method is provided and is performed by a decoder side, where the method includes: receiving background-picture indication information, a background-picture bitstream, and a primary bitstream, where the background-picture indication information is used to indicate a time point from which a background picture is used as a reference picture, the background-picture bitstream includes a bitstream obtained by encoding the background picture, and the primary bitstream includes a coded bitstream of a video picture encoded by using the background picture as the reference picture; and decoding the primary bitstream by using the background picture as the reference picture from the time point indicated by the background-picture indication information. In this solution, the time point from which the background picture is used as the reference picture is indicated by the background-picture indication information, and the decoder side uses the background picture as the reference picture to perform decoding from the time point indicated by the background-picture indication information. Therefore, time points at which the decoder side and an encoder side use the reference picture can be synchronized by using the background-picture indication information. Based on the synchronization mechanism, the background-picture bitstream can be flexibly transmitted without following a requirement that transmission of the background-picture bitstream should be completed before processing of a next to-be-coded picture. Accordingly, this avoids freeze and wait and a frame drop operation caused by overload of high-quality background picture transmission.

In a possible implementation in the second aspect of the present disclosure, the primary bitstream includes at least one random access segment, and during implementation, the decoding the primary bitstream by using the background picture as the reference picture from the time point indicated by the background-picture indication information may be: decoding the primary bitstream by using the background picture as a reference picture for each random access segment in the primary bitstream from the time point indicated by the background-picture indication information. In this way, the background picture is used as the reference picture from the time point indicated by the background-picture indication information without a need of retransmitting the background picture in each random access segment. In other words, the background picture can be used cross random access points, so that retransmission of the background picture is avoided, and overheads are reduced.

In a possible implementation in the second aspect of the present disclosure, during specific implementation, the decoding the primary bitstream by using the background picture as a reference picture for each random access segment in the primary bitstream from the time point indicated by the background-picture indication information may be: inserting the background-picture bitstream into a start location of each random access segment in the primary bitstream from the time point indicated by the background-picture indication information, to obtain a combined bitstream, and decoding the combined bitstream.

In a possible implementation in the second aspect of the present disclosure, during specific implementation, the decoding the primary bitstream by using the background picture as a reference picture for each random access segment in the primary bitstream from the time point indicated by the background-picture indication information may be: decoding the background-picture bitstream to obtain a reconstructed background picture; and decoding the primary bitstream by using the reconstructed background picture as the reference picture for each random access segment in the primary bitstream from the time point indicated by the background-picture indication information.

In a possible implementation in the second aspect of the present disclosure, the background-picture bitstream is a high-quality background-picture bitstream that is independently encoded, and during specific implementation, the decoding the primary bitstream by using the background picture as the reference picture from the time point indicated by the background-picture indication information may be: decoding the background-picture bitstream to obtain a high-quality background picture, and from a time point indicated by the background picture, identifying a corresponding conventionally-coded background picture that is in a DPB (Decoding picture Buffer), replacing the conventionally-coded background picture with the high-quality background picture, and decoding the primary bitstream by using the high-quality background picture as the reference picture, where picture quality of the high-quality background picture is higher than picture quality of the conventionally-coded background picture.

In a possible implementation in the second aspect of the present disclosure, during specific implementation, the decoding the primary bitstream by using the background picture as the reference picture from the time point indicated by the background-picture indication information may be: from the time point indicated by the background-picture indication information, determining, based on a background-picture reference flag in header information of a coding picture in the primary bitstream, whether the background picture is used as a reference picture for a currently coding picture; and if it is determined that the background picture is used as the reference picture, creating an initial reference picture list, and then inserting the background picture into the reference picture list.

In a possible implementation in the second aspect of the present disclosure, during specific implementation, the decoding the primary bitstream by using the background picture as the reference picture from the time point indicated by the background-picture indication information may be: decoding the primary bitstream by using the background picture as an optional reference picture for each coding picture in the primary bitstream from the time point indicated by the background-picture indication information.

According to a third aspect of the present disclosure, a video encoding device is provided. The video encoding device is designed to perform functions in the video encoding method in the first aspect and the possible implementations of the first aspect. The functions may be implemented by using hardware, or may be implemented by hardware executing corresponding software. The hardware or software includes one or more components, units, or modules that correspond to the foregoing functions.

According to the third aspect, the video encoding device includes: an encoder, configured to determine a background picture that is to be used as a reference picture, and encode the background picture to generate a background-picture bitstream; generate background-picture indication information, where the background-picture indication information is used to indicate a time point from which the background picture is used as the reference picture; and encode to-be-coded video pictures by using the background picture as the reference picture from the time point indicated by the background-picture indication information, to generate a primary bitstream; and an output interface, configured to output the background-picture bitstream, the primary bitstream, and the background-picture indication information.

In a possible implementation in the third aspect of the present disclosure, the encoder includes: a background-picture bitstream generation unit, configured to determine the background picture that is to be used as the reference picture, encode the background picture to generate the background-picture bitstream, and transmit, by using the output interface, the background-picture bitstream; a background-picture indication information generation unit, configured to generate the background-picture indication information, and transmit, by using the output interface, the background-picture indication information, where the background-picture indication information is used to indicate the time point from which the background picture is used as the reference picture; and a primary bitstream encoding unit, configured to encode the to-be-coded video pictures by using the background picture as the reference picture from the time point indicated by the background-picture indication information, to generate the primary bitstream, and transmit the primary bitstream by using the output interface.

According to a fourth aspect of the present disclosure, a video decoding device is provided. The decoding device is designed to perform functions in the video decoding method in the second aspect and the possible implementations of the second aspect. The functions may be implemented by using hardware, or may be implemented by hardware executing corresponding software. The hardware or software includes one or more components, units, or modules that correspond to the foregoing functions.

According to a fourth aspect of the present disclosure, the video decoding device includes: an input interface, configured to receive background-picture indication information, a background-picture bitstream, and a primary bitstream, where the background-picture indication information is used to indicate a time point from which a background picture is used as a reference picture, the background-picture bitstream includes a bitstream obtained by encoding the background picture, and the primary bitstream includes a coded bitstream of a video picture encoded by using the background picture as the reference picture; and a decoder, configured to decode the primary bitstream by using the background picture as the reference picture from the time point indicated by the background-picture indication information.

In a possible implementation in the fourth aspect of the present disclosure, the decoder includes: a bitstream combination unit, configured to insert the background-picture bitstream into a start location of each random access segment in the primary bitstream from the time point indicated by the background-picture indication information, to obtain a combined bitstream; and a primary bitstream decoding unit, configured to decode the combined bitstream.

In a possible implementation in the fourth aspect of the present disclosure, the decoder includes: a background picture decoding unit, configured to decode the background-picture bitstream to obtain a reconstructed background picture; and a primary bitstream decoding unit, configured to decode the primary bitstream by using the reconstructed background picture as the reference picture for each random access segment in the primary bitstream from the time point indicated by the background-picture indication information.

In a possible implementation in the fourth aspect of the present disclosure, the background-picture bitstream is a high-quality background-picture bitstream that is independently encoded, the background picture decoding unit is configured to decode the background-picture bitstream to obtain a high-quality background picture, and the primary bitstream decoding unit is configured to: after a time point indicated by the background picture, identify a corresponding conventionally-coded background picture that is in a DPB (Decoding picture Buffer), replace the conventionally-coded background picture with the high-quality background picture, and decode the primary bitstream by using the high-quality background picture as the reference picture, where picture quality of the high-quality background picture is higher than that of the conventionally-coded background picture.

In a possible implementation in the fourth aspect of the present disclosure, the primary bitstream decoding unit is configured to: from the time point indicated by the background-picture indication information, determine, based on a background-picture reference flag in header information of a coding picture in the primary bitstream, whether the background picture is used as a reference picture for a currently coding picture; and if it is determined that the background picture is used as the reference picture, create an initial reference picture list, and then insert the background picture into the reference picture list.

In a possible implementation in the fourth aspect of the present disclosure, the primary bitstream decoding unit decodes the primary bitstream by using the reconstructed background picture as an optional reference picture for each coding picture in the primary bitstream from the time point indicated by the background-picture indication information.

In the technical solutions provided in one or more aspects of the present disclosure, and in possible implementations of one or more aspects of the present disclosure, preferably, the background-picture indication information is determined based on a current transmission channel bandwidth status and a background-picture compression bitstream size. Therefore, when real-time transmission cannot be performed because a background-picture bitstream rate exceeds a channel transmission capacity, transmission needs to be completed only before a time point indicated by indication information, so as to reduce or avoid decoding and playback freeze and wait, and frame drop that are caused by a failure of performing real-time transmission.

In the technical solutions provided in one or more aspects of the present disclosure, and in possible implementations of one or more aspects of the present disclosure, preferably, the background-picture indication information is background-picture usage delay duration, and starting from the time point indicated by the background-picture indication information means starting from a time indicated by the background-picture usage delay duration; or the background-picture indication information is a background-picture initial usage flag, and starting from the time point indicated by the background-picture indication information means starting from a time at which the background-picture initial usage flag appears.

In the technical solutions provided in one or more aspects of the present disclosure, and in possible implementations of one or more aspects of the present disclosure, preferably, the background-picture indication information is background-picture usage delay duration.

In the technical solutions provided in one or more aspects of the present disclosure, and in possible implementations of one or more aspects of the present disclosure, preferably, the background-picture usage delay duration is an interval from a time at which the background picture is initially encoded to a time at which the background picture is used as the reference picture for to-be-coded video pictures.

In the technical solutions provided in one or more aspects of the present disclosure, and in possible implementations of one or more aspects of the present disclosure, preferably, information about the background-picture usage delay duration may be carried in header information of the background picture or set in a SEI (Supplemental Enhancement Information) message or a PPS (Picture Parameter Set).

In the technical solutions provided in one or more aspects of the present disclosure, and in possible implementations of the one or more aspects of the present disclosure, preferably, the background-picture usage delay duration may be represented in any one of the following manners: (1) a time interval counted in milliseconds or seconds; (2) a difference between a coded video sequence CVS (Coded Video Sequence) count of a currently coding picture and a CVS count of a coding picture for which the background picture is initially used; and (3) a difference between a POC (Picture Order Count) of the background picture and a POC of a coding picture for which the background picture is initially used, where the POC is a number associated with each compression-coding picture, and the POC is counted based on a playback order of a video picture sequence and may be used to identify each compression-coding picture.

In the technical solutions provided in one or more aspects of the present disclosure, and in possible implementations of the one or more aspects of the present disclosure, preferably, the background-picture indication information is a background-picture initial usage flag, and the decoder side sends feedback information to the encoder side after completing receiving the background-picture bitstream, where the feedback information is used to indicate that transmission of the background-picture bitstream ends; and the sending, by the encoder side, the background-picture indication information means sending, by the encoder side, the background-picture initial usage flag after receiving the feedback information sent by the decoder side, and the receiving, by the decoder side, the background-picture indication information means receiving, by the decoder side, the background-picture initial usage flag from the encoder side after sending the feedback information.

According to a fifth aspect of the present disclosure, a computer readable storage medium storing an instruction is provided. When being executed, the instruction instructs one or more processors of a device that is configured to perform video encoding on video data, to perform the video encoding method in the first aspect and the possible implementations of the first aspect.

According to a sixth aspect of the present disclosure, a video encoding device is provided and includes one or more processors. The video encoding device performs, based on the processors, the video encoding method in the first aspect and the possible implementations of the first aspect, and outputs a background-picture bitstream, a primary bitstream, and background-picture indication information by using an output interface.

According to a seventh aspect of the present disclosure, a computer readable storage medium storing an instruction is provided. When being executed, the instruction instructs one or more processors of a device that is configured to perform video decoding on video data, to perform the video decoding method in the second aspect and the possible implementations of the second aspect.

According to an eighth aspect of the present disclosure, a video decoding device is provided and includes one or more processors. The video decoding device receives a background-picture bitstream, a primary bitstream, and background-picture indication information by using an input interface, and performs, based on the processors, the video decoding method in the second aspect and the possible implementations of the second aspect.

In the embodiments of the present disclosure, the using the background picture as the reference picture may be understood in the following manner: On the encoder side, the background picture is used as the reference picture to encode the to-be-coded video pictures. To be specific, the background picture may be selected as a reference picture to encode each to-be-coded picture of the to-be-coded video pictures. On the decoder side, the background picture is used as the reference picture to decode the primary bitstream. To be specific, the background picture is used as an optional reference picture to decode each coding picture in the primary bitstream, that is, the background picture may be selected as the reference picture to decode each coding picture in the primary bitstream.

For ease of description, in this specification, the using the background picture as the reference picture means using a reconstructed picture of the background picture as the reference picture. The reconstructed picture of the background picture may be obtained after the background picture is encoded, and the reconstructed picture may be selected as a reference picture to perform an inter-frame prediction coding operation on a subsequent to-be-coded picture.

In can be learned from the foregoing description that, according to one or more aspects of the present disclosure, the time point from which the background picture is used as the reference picture to encode the to-be-coded video pictures is indicated by the background-picture indication information, and the decoder side uses the background picture as the reference picture to perform decoding from the time point indicated by the background-picture indication information. Therefore, time points at which the decoder side and the encoder side use the reference picture can be synchronized by using the background-picture indication information, and transmission of the background picture needs to be completed only before the time point indicated by the indication information, so as to reduce or avoid freeze, wait, and a frame drop operation that are caused by wait for the background picture during decoding and playback.

BRIEF DESCRIPTION OF DRAWINGS

To describe the technical solutions in the embodiments of the present disclosure more clearly, the following briefly describes the accompanying drawings required for describing the embodiments or the prior art.

DESCRIPTION OF EMBODIMENTS

Figure 1:
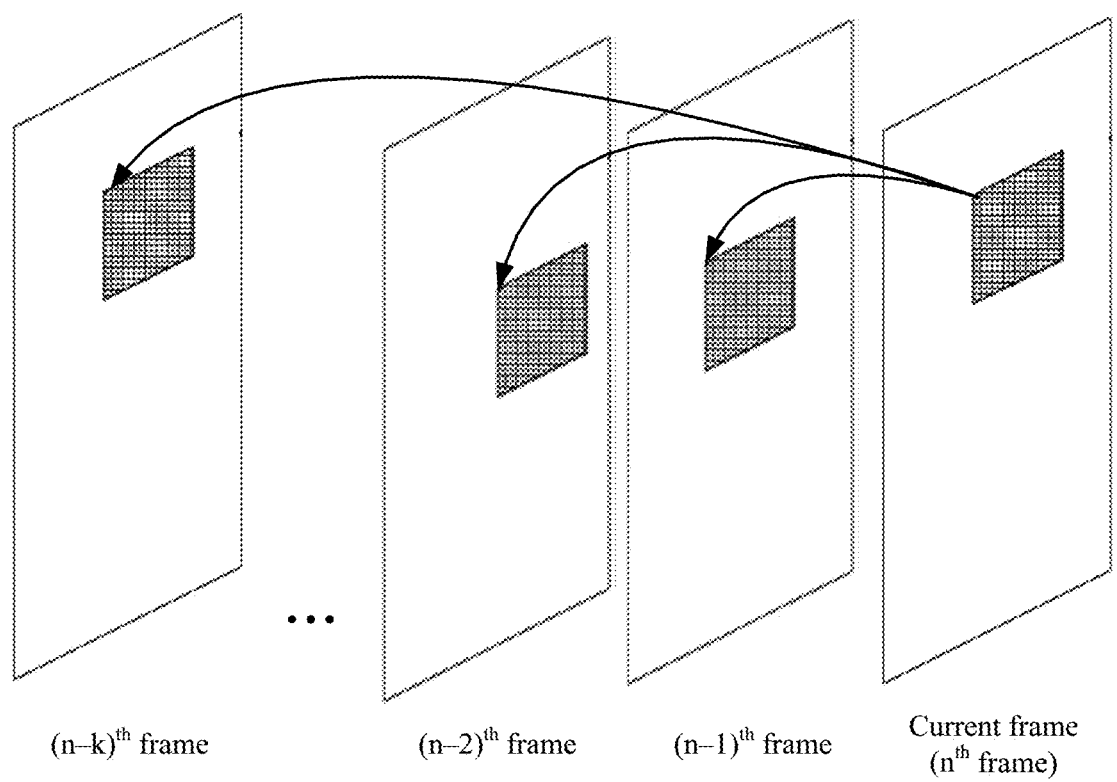
FIG. 1 is a diagram of a relationship between reference frames in a motion estimation process according to a video encoding/decoding technology.
Figure 2:
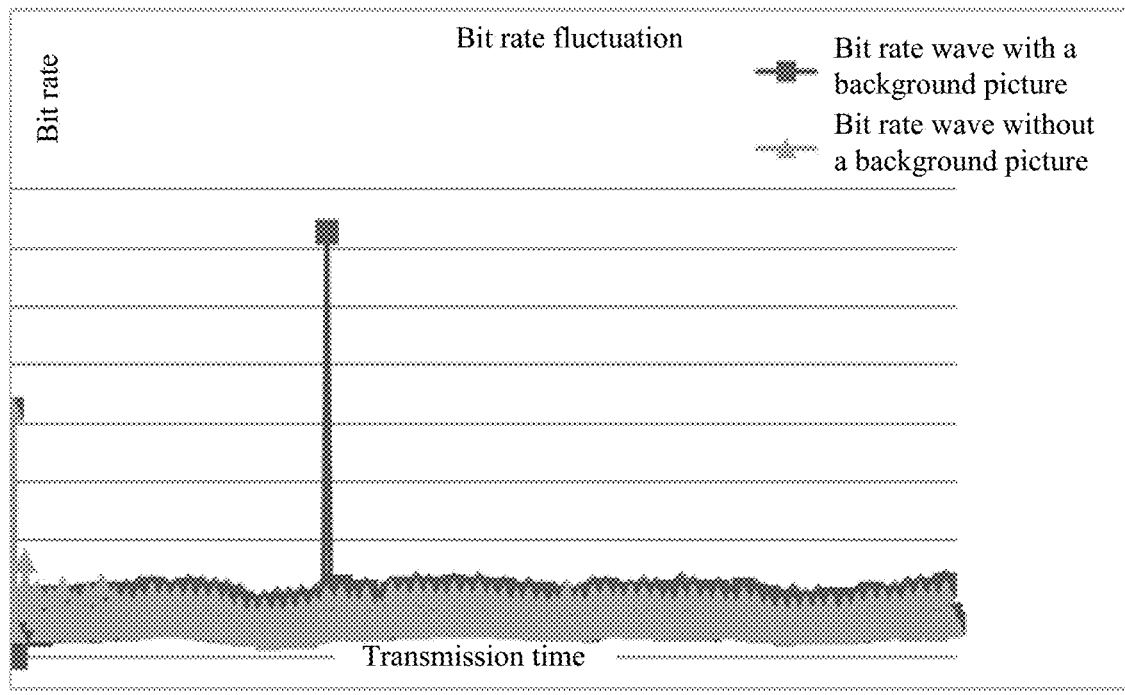
FIG. 2 is a diagram of a bit rate fluctuation when a background picture is used during encoding and a bit rate fluctuation when no background picture is used during encoding.

The following clearly describes the technical solutions in the embodiments of the present disclosure with reference to the accompanying drawings in the embodiments of the present disclosure.

A video encoding/decoding method provided in the embodiments of the present disclosure is applicable to a plurality of video encoding/decoding scenarios, such as a video conference or a monitoring video. In these scenarios, using a background picture as a reference picture can obviously improve coding efficiency. However, a reference picture used in the present disclosure is not limited to the background picture, but may be another important reference picture. A concept of the background picture in the present disclosure may be understood as all important reference pictures. The important reference pictures include but are not limited to one of the following characteristic regions: (a) A background region that is in a sequence and that is repeatedly blocked or unblocked by a foreground; (b) content that is newly brought to a scenario, for example, new background content brought by shaking, zooming, panning, or the like of a camera lens, or foreground content that newly enters into a background and that keeps still; (c) a scenario that keeps unchanged for a long time and that may be used as a reference picture for a plurality of subsequent to-be-coded pictures; and the like. The background picture or the important reference picture may be selected from a to-be-coded video picture sequence, or may be obtained through combination, and this is not limited in the present disclosure. The embodiments of the present disclosure are applicable to coding standards such as H.265 and H.264 and video compression coding solutions other than the standards, and this is not limited herein.

In this specification, that a background picture is used as a reference picture to encode to-be-coded video pictures can be understood as that the background picture may be selected as a reference picture to encode each to-be-coded picture of the to-be-coded video pictures; and that the background picture is used as the reference picture to encode the to-be-coded video pictures from a time point indicated by background-picture indication information may be understood as that the background picture is used as an optional reference picture to encode each to-be-coded picture of the to-be-coded video pictures from the time point indicated by the background-picture indication information, to obtain a coding picture. On a decoder side, this can be understood as that the background picture is used as the reference picture to decode a primary bitstream. To be specific, the background picture may be used as an optional reference picture to decode each coding picture in the primary bitstream, that is, the background picture may be selected as the reference picture to decode each coding picture in the primary bitstream. In actual application, it is relatively common that the background picture is used as a high-quality reference picture for a long term, in particular, in a real-time video application scenario. For ease of description, in the embodiments, that the background picture is used as the reference picture is used as an example for description. It can be easily understood that, another high-quality reference picture is applicable to the solutions of the present disclosure, and no limitation is imposed on selection of a reference picture for the to-be-coded video pictures.

Embodiment 1

Encoder Side

Figure 3:
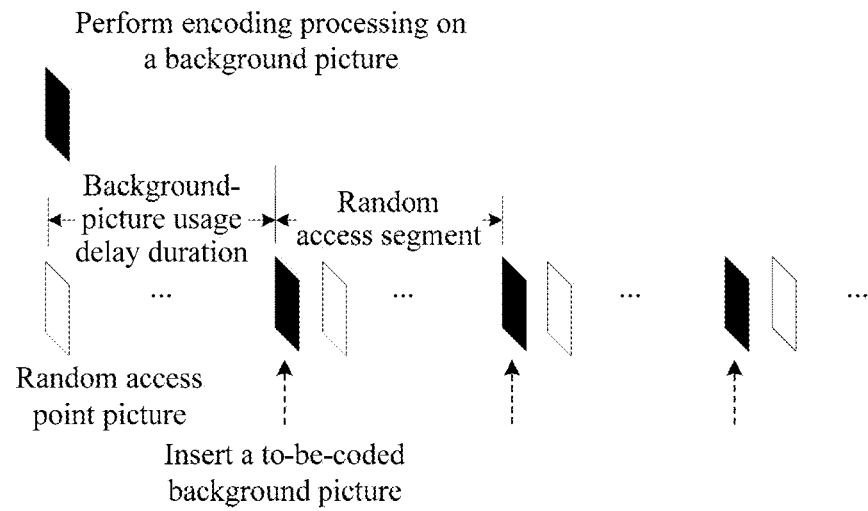
FIG. 3 is a schematic diagram of encoding processing performed by an encoder side according to an embodiment of the present disclosure.

Referring to FIG. 3, in Embodiment 1 provided in the present disclosure, the encoder side performs the following method.

Step a. Determine a background picture, where the background picture is to be used as a reference picture. The background picture may be constructed in a manner such as time-domain mean filtering or Gaussian modeling, or be selected from a collected video picture sequence based on a principle such as a minimum motion energy principle, or be selected from a to-be-coded video picture sequence based on another principle. In this embodiment, preferably, when background content changes, a new background picture needs to be obtained.

Step b. Perform compression encoding processing on the background picture to generate a background-picture bitstream, and transmit the background-picture bitstream. In this embodiment, any existing intra-frame prediction coding technology may be used to perform compression encoding processing on the background picture. The background picture is not used for display but is used only as a reference picture for to-be-coded video pictures, and the obtained background-picture compression bitstream is transmitted. It should be noted, a reconstructed picture of the background picture may be obtained after the background picture is encoded, and the reconstructed picture may be selected as a reference picture to perform an inter-frame prediction coding operation on a subsequent to-be-coded picture. For ease of description, in this specification, the using the background picture as the reference picture means using the reconstructed picture of the background picture as the reference picture.

In this embodiment, when the background picture is used as a first to-be-coded picture of a random access segment to perform an encoding operation, particularly, if implementation is based on video standards such as H.264 and H.265, a POC of the background picture needs to be set to 0. It can be learned by referring to the standards that, the POC is a number associated with each compression-coding picture, and the POC is counted based on a playback order of a video picture sequence and may be used to identify each compression-coding picture.

A decoder side needs to identify the background-picture bitstream, and therefore the background-picture bitstream needs to be identified. Identification may be performed in header information of the background-picture compression bitstream. For example, if implementation is based on the H.265 standard, a new field may be added (for example, bg_ref_flag is added) into a NALU header, or a new type may be added into an existing field such as a NALU type field (for example, if implementation is based on the H.26x standard, an unused NALU type value such as 50 may be selected) for identification. Alternatively, a new SEI message may be added to identify a picture bitstream as the background-picture bitstream. For example, if implementation is based on the H.26x standard, new seipayload bg_ref_flag may be added into sei_message( ) for the background picture, to specify that the coding picture is the background picture. Optionally, the background-picture bitstream may be packaged independently for transmission, so as to be identified by using a system layer identifier. For example, a new background picture information description box is added based on the ISO base file format standard protocol, to describe background picture information and carry a coded bitstream of the background picture.

Step c. Generate and send background-picture indication information, where the background-picture indication information is used to indicate a time point from which the background picture is used as the reference picture. On the encoder side, using the background picture as the reference picture may be understood as using the background picture as the reference picture to encode the to-be-coded video pictures from the time point indicated by the background-picture indication information, that is, the background picture may be selected as a reference picture to encode each to-be-coded picture of the to-be-coded video pictures. The background-picture indication information may be background-picture usage delay duration or a background-picture initial usage flag. The background-picture indication information is used to synchronize operations, on the transmit end and the decoder side, of using the background picture as the reference picture to perform coding.

The background-picture usage delay duration is an interval from a time at which the background picture is initially encoded to a time at which the background picture is used as the reference picture for the to-be-coded video pictures. The background-picture usage delay duration may be a pre-configured value of the transmit end or the decoder side, or may be determined and notified to the decoder side by the transmit end. The encoder side may determine the background-picture usage delay duration based on a current transmission channel bandwidth status and a background-picture compression bitstream size. The encoder side and the decoder side need to cooperate to ensure that transmission of the background-picture bitstream is completed within the time interval.

The background-picture usage delay duration may be represented by using a plurality of methods. The background-picture usage delay duration may be a time interval counted in milliseconds or seconds, a difference between a CVS (Coded Video Sequence) count of a currently coding picture and a CVS count of a coding picture for which the background picture is initially used, or a difference between a POC (Picture Order Count) of the background picture and a POC of a coding picture for which the background picture is initially used.

For meaning of the CVS and the POC throughout this specification, refer to definitions in related video standards. For example, in the video standards H.264 and H.265, it is prescribed that one complete segment video bitstream is one CVS (Coded Video Sequence), one CVS starts with one random access point (Random Access Point) picture, and a cycle in which a random access point picture appears may be set by the encoder side. The POC is a number associated with each compression-coding picture, and the POC is counted based on a playback order of a video picture sequence and may be used to identify each compression-coding picture. The POC is reset at a random access point; therefore, the representation method in which a POC number is used is applicable to a case in which the background picture is used within a single random access segment. Information about the background-picture usage delay duration may be carried in header information of a coding picture that is adjacent or approximates to the background picture according to an encoding order or a playback order. For example, when reference is made to the H.26x standard, a delay duration field delayed_ref_duration may be added into a slice header of a first slice of the to-be-coded picture, to represent the background-picture usage delay duration. The information about the background-picture usage delay duration may be carried in a SEI message of the to-be-coded picture, for example, if implementation is based on the H.26x standard, new sei_payload delayed_ref_duration may be added into sei_message( ) for the to-be-coded picture, to represent the background-picture usage delay duration. The information about the background-picture usage delay duration may be further carried in a primary bitstream PPS (Picture Parameter Set), for example, if implementation is based on the H.26x standard, a new field delayed_ref_duration may be added into the PPS. The information about the background-picture usage delay duration may be further carried at a location other than the foregoing locations. For definitions and descriptions about the SEI message and the PPS that are mentioned throughout this specification, refer to related video standards such as H.264 and H.265. Supplemental Enhancement Information (Supplemental Enhancement Information, SEI) is defined in the standards, and the SEI includes information such as video picture presence timing, and interleaves with bitstream data of a video sequence picture.

In this specification, the sending background-picture indication information may be understood as follows: the background-picture indication information may be sent directly or may be sent with a primary bitstream.

The background-picture initial usage flag is sent to the decoder side by the transmit end, to instruct a decoder of the decoder side to use the background picture as the reference picture to process a subsequent to-be-coded picture. Before sending the flag, the transmit end needs to determine that the decoder side has correctly received the background-picture bitstream. This may be implemented by using background-picture bitstream transmission ending feedback information from the decoder side. The background-picture initial usage flag is used to indicate that the background picture may be used as a reference picture for a coding picture that is after the initial usage flag appears. The background-picture initial usage flag may be carried in header information of a coding picture for which the background picture is initially used as the reference picture. For example, if implementation is based on the H.26x standard, a delay duration field delayed_ref_active_flag may be added into a slice header of a first slice of the foregoing coding picture, to represent the background-picture initial usage flag. The background-picture initial usage flag may be carried in a SEI message of the to-be-coded picture, for example, if implementation is based on the H.26x standard, new sei_payload delayed_ref_active_flag may be added into sei_message( ) of the to-be-coded picture, to represent the background-picture initial usage flag. The background-picture initial usage flag may be further carried in a primary bitstream PPS (Picture Parameter Set), for example, if implementation is based on the H.26x standard, a new field delayed_ref_active_flag may be added into the PPS, to represent the background-picture initial usage flag. The background-picture initial usage flag may be further carried at a location other than the foregoing locations.

If the background-picture usage delay duration is used as the background-picture indication information, transmission of the background-picture bitstream needs to be completed within the background-picture usage delay duration, so that the decoder can correctly complete background picture decoding before using the background picture as the reference picture. In addition, no constraint is imposed on an order of transmitting the background-picture bitstream and the primary bitstream.

If the background-picture initial usage flag is used as the background-picture indication information, after receiving the background-picture bitstream transmission ending feedback information sent by the decoder side, the transmit end starts to use the background picture as the reference picture for the to-be-coded picture, to perform an inter-frame prediction operation on the to-be-coded picture. At the same time, the encoder side sends the background-picture initial usage flag to the decoder side, to notify the decoder of the decoder side that the background picture start to be used as the reference picture to process a subsequent to-be-coded picture. In this way, it is ensured that usage of the background picture is synchronized between the encoder side and the decoder side. The background-picture bitstream transmission ending feedback information is sent to the decoder side after the decoder side correctly receives the background-picture bitstream, to notify an encoder of the decoder side that the background picture starts to be used as the reference picture for a subsequent to-be-coded picture. When receiving a plurality of background-picture bitstreams, the decoder side sends one piece of feedback information for each background-picture bitstream.

Step d. Encode to-be-coded video pictures by using the background picture as the reference picture from the time point indicated by the background-picture indication information, to obtain a primary bitstream, and transmit the primary bitstream. From the time point indicated by the background-picture indication information, the background picture is used as an optional reference picture to encode each to-be-coded picture of the to-be-coded video pictures, to obtain a coding picture.

Figure 4:
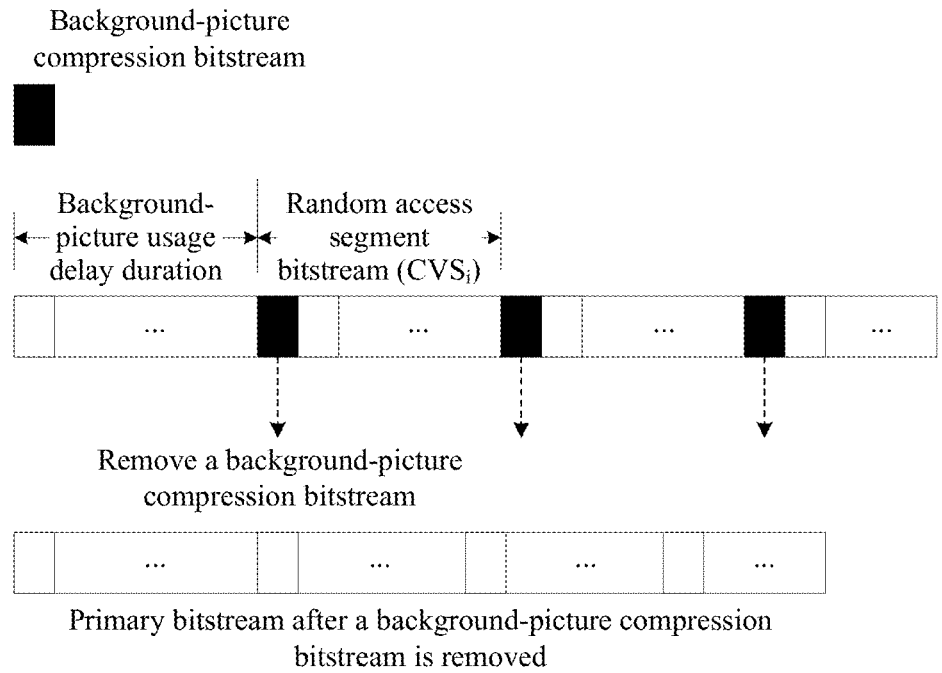
FIG. 4 is a schematic diagram of bitstream processing performed by an encoder side according to an embodiment of the present disclosure.

Referring to FIG. 4, the encoder side starts to use the background picture as the reference picture for the to-be-coded video pictures based on the foregoing background-picture indication information, to perform compression encoding on the to-be-coded video pictures to obtain the primary bitstream, and transmits the primary bitstream to the decoder side.

From the time indicated by the background-picture usage delay duration or after the background-picture initial usage flag is sent, the background picture is used as a first picture in each random access segment that is after the background picture, to perform encoding processing. The encoder inserts a to-be-coded background picture into a to-be-coded picture sequence by placing the to-be-coded background picture before each random access point picture, and then performs compression encoding on a newly constructed to-be-coded picture sequence. After encoding is completed, a background-picture compression bitstream part in a generated compression bitstream needs to be removed to obtain the primary bitstream. Any existing technical solution may be used to perform compression encoding. When encoding processing is performed on the to-be-coded background picture, a manner exactly the same as that in step b needs to be used to generate a same background-picture compression bitstream and reconstructed background picture. The background picture may be identified as a long-term reference picture and used as a reference picture for all coding pictures in an entire random access segment. Alternatively, whether the background picture is used as the reference picture may be determined for each to-be-coded picture based on rate distortion optimization.

Optionally, to avoid repetition of an encoding operation performed on the to-be-coded background picture, the coding operation performed on the to-be-coded background picture may alternatively be skipped; however, the reconstructed background picture previously generated in step b needs to be placed into a DPB, so as to be used as a reference picture for a subsequent to-be-coded picture. When a CVS is generated through encoding or a CVS is decoded, a DPB (Decoding picture Buffer) is initialized and maintained to store corresponding reconstructed pictures that are obtained after the encoding operation is performed on the to-be-coded pictures. These reconstructed pictures may be used as short-term reference pictures and long-term reference pictures, to predict and code a currently to-be-coded picture and a subsequent to-be-coded picture. Meaning of the DPB throughout this specification may be understood according to the foregoing description.

Decoder Side

Figure 5:
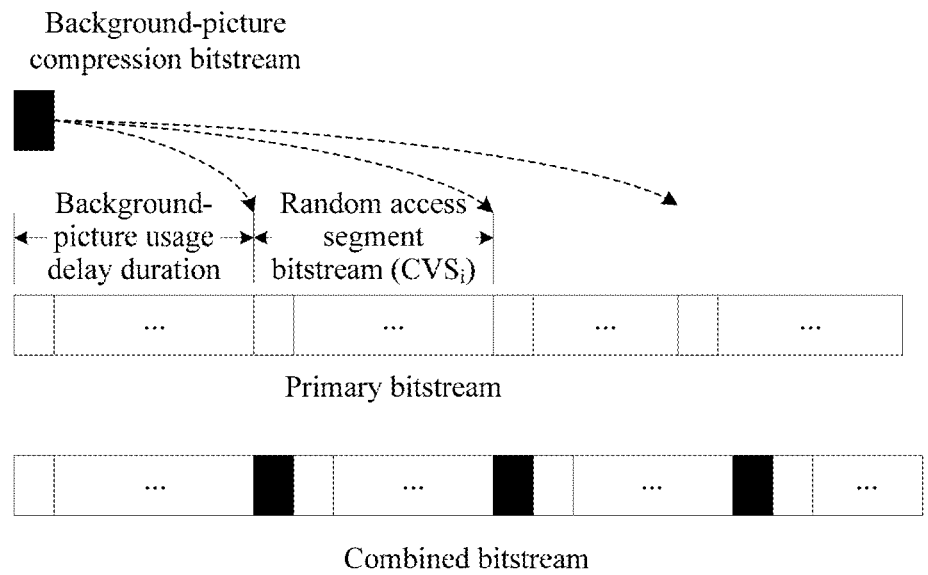
FIG. 5 is a schematic diagram of bitstream processing performed by a decoder side according to an embodiment of the present disclosure.

Referring to FIG. 5, FIG. 5 is bitstream processing performed by the decoder side. In step a, the decoder side receives the background-picture bitstream, the background-picture indication information, and the primary bitstream. The background-picture indication information is used to indicate the time point from which the background picture is used as the reference picture, and the primary bitstream includes a coded bitstream of a video picture encoded by using the background picture as the reference picture. On the decoder side, using the background picture as the reference picture may be understood as using the background picture as the reference picture to decode the primary bitstream. To be specific, the background picture may be used as an optional reference picture to decode each coding picture in the primary bitstream, that is, the background picture may be selected as the reference picture to decode each coding picture in the primary bitstream.

If the background-picture usage delay duration is used as the background-picture indication information, the encoder side needs to complete transmission of the background-picture bitstream within the background-picture usage delay duration, that is, the decoder side can obtain the background-picture bitstream within the background-picture usage delay duration, so as to ensure that the decoder side can correctly complete a background picture decoding operation before using the background picture as the reference picture. In addition, no constraint is imposed on an order of transmitting the background-picture bitstream and the primary bitstream.

If the background-picture initial usage flag is used as the background-picture indication information, after correctly receiving the background-picture bitstream, the decoder side sends the background-picture bitstream transmission ending feedback information to the encoder side. If the encoder side receives the ending feedback information, the encoder side determines that the decoder side completes receiving the background-picture bitstream. In this case, the encoder side may start to use the background picture as the reference picture for a subsequent to-be-coded picture. When starting to use the background picture as the reference picture to encode a to-be-coded video, the encoder side sends the background-picture initial usage flag to the decoder side. When receiving a plurality of background-picture bitstreams, the decoder side sends one piece of feedback information for each background-picture bitstream.

The decoder side may identify the background-picture bitstream based on a newly-added field in a NALU header or a newly-added field in a SEI message, that is, background-picture bitstream identification information. Optionally, the background-picture bitstream may alternatively be identified by using a system layer identifier. A same representation method is agreed to be used for encoder and decoder; therefore, herein, reference may be made to description related to the encoder side in this embodiment.

Step b. Insert the background-picture bitstream into the primary bitstream based on the background-picture indication information, to obtain a combined bitstream.

If the background-picture usage delay duration is used as the background-picture indication information, the received background-picture bitstream is inserted before a first coding picture bitstream of each random access segment that is after the time indicated by the background-picture usage delay duration of the background-picture bitstream.

If the background-picture initial usage flag is used as the background-picture indication information, after the flag is received, a latest background-picture bitstream is inserted before a first coding picture bitstream of each subsequent random access segment.

Step c. Perform a decoding operation on the combined bitstream. The decoding operation is performed on the combined bitstream. The decoded background picture is used as the reference picture for only a subsequent to-be-coded picture, but is not used for display and playback.

A same bitstream specification is agreed to be followed for encoding and decoding; therefore, definitions of the background-picture bitstream identification information and the background-picture indication information are the same on the encoder side and the decoder side.

Embodiment 2

In Embodiment 2 provided in the present disclosure, a part that is the same as Embodiment 1 is not repeatedly described. A difference between Embodiment 2 and Embodiment 1 lies in that after a decoder side completes step of receiving background-picture indication information, a background-picture bitstream, and a primary bitstream, the decoder side performs the following steps.

Step b. Decode the background-picture bitstream to obtain a reconstructed background picture.

Step c. Decode a coding picture in the primary bitstream based on the background-picture indication information and the reconstructed background picture.

The reconstructed background picture is used as an optional reference picture for each coding picture in the primary bitstream from a time point indicated by the background-picture indication information, to decode the primary bitstream.

The reconstructed background picture is used as the reference picture after the time point indicated by the background-picture indication information, to decode the coding pictures in the primary bitstream. In this embodiment, when the coding picture includes a plurality of random access segments, after the time pointed indicated by the background-picture indication information, the background picture is used as the reference picture to decode each random access segment included in the coding picture.

If background-picture usage delay duration is used as the background-picture indication information, before a first coding picture of each random access segment that is after a time indicated by the background-picture usage delay duration is decoded, the reconstructed background picture is placed into a DPB (Decoding picture Buffer). In an encoding/decoding process, when a CVS is generated through encoding or a CVS is decoded, a DPB (Decoding picture Buffer) is initialized and maintained to store reconstructed pictures. These reconstructed pictures may be used as short-term reference pictures and long-term reference pictures, to predict and code a currently to-be-coded picture and a subsequent to-be-coded picture.

If a background-picture initial usage flag is used as the background-picture indication information, before a first coding picture bitstream of each random access segment that is after the background-picture initial usage flag appears is decoded, the reconstructed background picture is placed into a DPB.

It can be understood that, in Embodiment 1, the decoder side first combines the primary bitstream and the background-picture bitstream (un-decoded) together, and then decodes a single bitstream, while the decoder side in Embodiment 2 first decodes the background-picture bitstream to obtain the reconstructed background picture, and then invokes the reconstructed background picture as the reference picture to perform primary bitstream decoding.

Embodiment 3

Encoder Side

Step a. Determine a background picture that is to be used as a reference picture, where the background picture may be obtained from to-be-coded video pictures or a collected video sequence. When the background picture is selected from a to-be-coded video picture sequence, the background picture needs to be displayed on a decoder side. Alternatively, the background picture may be selected from the collected video picture sequence based on a principle such as a minimum motion energy principle, or may be selected from the to-be-coded video picture sequence based on another principle. In this embodiment of the present disclosure, only one effective background picture is used at any time point, and when background content changes, a new background picture is obtained.

Step b. Perform compression encoding processing on the background picture to generate a background-picture compression bitstream, and transmit the background-picture compression bitstream. In this step, preferably, high-quality compression encoding processing is independently performed on the background picture to obtain a high-quality background-picture bitstream, and the high-quality compression bitstream is transmitted to the decoder side. The high-quality compression encoding processing means that a suitable encoder parameter, such as a relatively high target bit rate or a relatively small quantization parameter, is selected to perform encoding processing on a to-be-coded picture, so as to obtain a coded reconstructed picture that is more approximate to an original un-coding picture than a conventionally-coded reconstructed picture.

High-quality compression encoding processing may be performed by using any existing coding technology. For example, intra-frame prediction coding may be performed on the to-be-coded picture, or a conventionally-coded background picture may be used as the reference picture to perform inter-frame prediction coding on the to-be-coded picture. Before high-quality compression encoding is performed on the background picture, the encoder side may have performed conventional encoding on video pictures including the background picture and transmitted conventionally-coded video pictures to the decoder side. That is, the encoder side has transmitted the conventionally-coded background picture to the decoder side. Herein, intra-frame prediction coding or inter-frame prediction coding may be selected as conventional encoding. It can be understood that picture quality of the high-quality background picture is higher than that of the conventionally-coded background picture.

The decoder side needs to identify the high-quality background-picture bitstream, and therefore the high-quality background-picture bitstream needs to be identified. Identification may be performed in header information of the background-picture compression bitstream. For example, if implementation is based on the H.265 standard, a new field may be added (for example, bg_ref_flag is added) into a NALU header, or a new type may be added into an existing field such as a NALU type field (for example, if implementation is based on the H.26x standard, an unused NALU type value such as 50 may be selected) for identification. Alternatively, a new SEI message may be added to identify a picture bitstream as the background-picture bitstream. For example, if implementation is based on the H.26x standard, new sei_payload bg_ref_flag may be added into sei_message( ) of the background picture, to specify that the coding picture is the background picture. Optionally, the background-picture bitstream may be packaged independently for transmission, so as to be identified by using a system layer identifier. For example, a new background picture information description box is added based on the ISO base file format standard protocol, to describe background picture information and carry a coded bitstream of the background picture.

In addition, the decoder side further needs to identify the conventionally-coded background picture corresponding to the high-quality background picture. This may be implemented by adding a background picture flag field into header information of the conventionally-coded background picture. For example, if implementation is based on the H.26x standard, bg_ref_low_quality_flag may be added into a slice header for identification. Alternatively, this may be implemented by setting a POC number of the high-quality version background picture to a POC number of the conventionally-coded background picture. The POC is reset at a random access point; therefore, the representation method in which the POC is used is applicable to a case in which the high-quality background picture is used within a single random access segment. However, when the conventionally-coded background picture is identified by adding a background picture flag field into information, for example, identified in the foregoing described identification manner of adding bg_ref_low_quality_flag into the slice header, the high-quality background picture can be used cross random access points.

Step c. Send background-picture indication information, where the background-picture indication information is used to indicate a time point from which the background picture is used as the reference picture. On the encoder side, using the background picture as the reference picture may be understood as using the background picture as the reference picture to encode the to-be-coded video pictures from the time point indicated by the background-picture indication information, that is, the background picture may be selected as a reference picture to encode each to-be-coded picture of the to-be-coded video pictures.

The background-picture indication information may be background-picture usage delay duration or a background-picture initial usage flag. The background-picture indication information is used to synchronize background picture processing operations on the transmit end and the decoder side.

The background-picture usage delay duration is an interval from a time at which the background picture is initially encoded to a time at which the background picture is used as the reference picture for the to-be-coded video pictures. Conventional encoding processing performed on the background picture is always before high-quality encoding processing performed on the background picture. In this embodiment, the background picture is selected from the to-be-coded pictures; therefore, a conventionally-coded version of the background picture, that is a conventional background picture, may be obtained when the to-be-coded pictures are encoded. Therefore, the background-picture usage delay duration may be described as an interval from a time at which the background picture is conventionally encoded to a time at which the high-quality version of the background picture is used as the reference picture for the to-be-coded video pictures. The background-picture usage delay duration may be a pre-configured value of the encoder side or the decoder side, or may be determined by the encoder side and then notified to the decoder side. The encoder side may determine the background-picture usage delay duration based on a current transmission channel bandwidth status and a high-quality background-picture compression bitstream size. The encoder side and the decoder side need to cooperate to ensure that transmission of the background-picture bitstream is completed within the time interval.

The background-picture usage delay duration may be represented by using a plurality of methods. The background-picture usage delay duration may be a time interval counted in milliseconds or seconds, a difference between a CVS (Coded Video Sequence) count of the conventionally-coded background picture and a CVS count of a coding picture for which the high-quality background picture is initially used, or a difference between a POC (Picture Order Count) of the conventionally-coded background picture and a POC of a coding picture for which the high-quality background picture is initially used. The POC is a number associated with each compression-coding picture, and the POC is counted based on a playback order of a video picture sequence and may be used to identify each compression-coding picture. The POC is reset at a random access point; therefore, the representation method is applicable to a case in which the background picture is used within a single random access segment. Information about the background-picture usage delay duration may be carried in header information of a coding picture of the conventional background picture, or newly added to a SEI message, a PPS (Picture Parameter Set), or another location.

The background-picture initial usage flag is sent to the decoder side by the encoder side, to instruct the decoder side to use the background picture as the reference picture to process a subsequent to-be-coded picture. Before sending the flag, the encoder side needs to determine that the decoder side has correctly received the background-picture bitstream. This may be implemented by using background-picture bitstream transmission ending feedback information from the decoder side. The background-picture initial usage flag is used to indicate that the background picture may be used as a reference picture for a coding picture that is after the initial usage flag appears. The background-picture initial usage flag may be carried in header information of a coding picture for which the background picture is initially used as the reference picture. The background-picture initial usage flag may be further carried in the SEI message of the to-be-coded picture, the primary bitstream PPS (Picture Parameter Set), or another location in the bitstream.

Step d. Encode the to-be-coded video pictures by using a high-quality background picture as the reference picture from the time point indicated by the background-picture indication information, to obtain a primary bitstream, and transmit the primary bitstream.

The encoder side starts to use the high-quality background picture as the reference picture for the to-be-coded video pictures based on the foregoing background-picture indication information, to perform the compression encoding operation on the to-be-coded video pictures. A video picture bitstream obtained through the encoding operation is referred to as the primary bitstream and needs to be transmitted to the decoder side. The primary bitstream may be obtained by using a conventional encoding method to perform the compression encoding operation. The primary bitstream includes a compression bitstream that is of a video picture encoded by using the high-quality background picture as the reference picture after the time point indicated by the background-picture indication information.

At a time indicated by the background-picture usage delay duration or a time at which the background-picture initial usage flag appears, an encoder identifies the conventionally-coded background picture that is in a DPB, and replaces the conventionally-coded background picture with the reconstructed high-quality background picture, so as to start to use the high-quality background picture as the reference picture for a subsequent to-be-coded picture. Then, compression encoding processing may continue being performed on a subsequent to-be-coded picture by using an existing technology. The background picture may be identified as a long-term reference picture and used as a reference picture for a plurality of subsequent to-be-coded pictures. Alternatively, whether the background picture is used as the reference picture is determined for each subsequent to-be-coded picture based on rate distortion optimization. If implementation is based on the standards in H.265, a reference picture of a currently coding picture may be enumerated by using a field related to an RPS (Reference Picture Set).

Decoder Side

Step a. Receive the background-picture bitstream, the background-picture indication information, and the primary bitstream. In this embodiment, the background-picture bitstream is an encoded bitstream of the high-quality background picture, the background-picture indication information is used to indicate the time point from which the background picture is used as the reference picture in the primary bitstream, and the primary bitstream includes an encoded bitstream of a video picture encoded by using the high-quality background picture as the reference picture. On the decoder side, using the background picture as the reference picture may be understood as using the background picture as the reference picture to decode the primary bitstream. To be specific, the background picture may be used as an optional reference picture to decode each coding picture in the primary bitstream, that is, the background picture may be selected as the reference picture to decode each coding picture in the primary bitstream.

The video picture that is in the primary bitstream and that is encoded by using the high-quality background picture as the reference picture includes one or more random access segments.

If the background-picture usage delay duration is used as the background-picture indication information, transmission of the high-quality background-picture bitstream needs to be completed within the background-picture usage delay duration, so as to ensure that the decoder side can correctly complete a background picture decoding operation before using the high-quality version background picture as the reference picture. In addition, no constraint is imposed on an order of transmitting the high-quality background-picture bitstream and the primary bitstream.

If the background-picture initial usage flag is used as the background-picture indication information, after the high-quality background-picture bitstream is correctly received, transmission ending feedback information is sent to the encoder side, to instruct the encoder side to use the high-quality background picture as the reference picture for a subsequent to-be-coded picture. When receiving a plurality of high-quality background-picture bitstreams, the decoder side sends one piece of feedback information for each background-picture bitstream. After sending the transmission ending feedback information to the encoder side, the decoder side receives the background-picture initial usage flag sent by the encoder side.

The decoder side may identify the high-quality background-picture bitstream based on a newly-added field in a NALU header or identification information in a SEI message. Optionally, the high-quality background-picture bitstream may alternatively be identified by using a system layer identifier. A same representation method is agreed to be used for encoder and decoder; therefore, herein, reference may be made to description related to the encoder side.

Step b. Perform a decoding operation on the background-picture bitstream to obtain the high-quality background picture.

Step c. Perform a decoding operation on the primary bitstream by using the high-quality background picture as the reference picture.

The high-quality background picture is used to replace the corresponding conventionally-coded background picture after a time point indicated by the background picture, the conventionally-coded background picture is stored in the DPB on the decoder side, and picture quality of the high-quality background picture is higher than that of the conventionally-coded background picture.

For example, after the time indicated by the background-picture usage delay duration and the time at which the background-picture initial usage flag is received, the decoder side identifies, based on a background picture flag field in header information of a coding picture or a POC number in header information of the high-quality background picture, the conventionally-coded background picture that is in the DPB, and replaces the conventionally-coded background picture with the decoded high-quality background picture, so as to start to use the high-quality version background picture as the reference picture for the subsequent to-be-coded picture. A corresponding decoding operation may be performed based on the method for encoding the high-quality background picture. In this embodiment, the decoding operation means replacing, at a specified time point, the conventionally-coded background picture that is in the DPB with the high-quality background picture.

Embodiment 4

Transmit End

Step a. Determine a background picture that is to be used as a reference picture.

The background picture may be constructed in a manner such as time-domain mean filtering or Gaussian modeling, or be selected from a collected video picture sequence based on a principle such as a minimum motion energy principle, or be selected from a to-be-coded video picture sequence based on another principle. In the solutions of the present disclosure, only one effective background picture is used at any time point, and when background content changes, a new background picture may be obtained.

Step b. Perform compression encoding processing on the background picture to obtain a background-picture bitstream, and transmit the background-picture bitstream.

Compression encoding processing may be performed on the background picture by using any existing intra-frame prediction coding technology. The background picture is not used for display but is used only as a reference picture for to-be-coded video pictures. The obtained background-picture bitstream is transmitted.

A decoder side needs to identify the background-picture bitstream, and therefore the background-picture bitstream needs to be identified. For example, if implementation is based on the H.265 standard, a new field may be added (for example, bg_ref_flag is added) into a NALU header, or a new type may be added into an existing field such as a NALU type field (for example, if implementation is based on the H.26x standard, an unused NALU type value such as 50 may be selected) for identification. Alternatively, a new SEI message may be added to identify a picture bitstream as the background-picture bitstream. For example, if implementation is based on the H.26x standard, new sei_payload bg_ref_flag may be added into sei_message( ) of the background picture, to specify that the coding picture is the background picture. Optionally, the background-picture bitstream may be packaged independently for transmission, so as to be identified by using a system layer identifier. For example, a new background picture information description box is added based on the ISO base file format standard protocol, to describe background picture information and carry a coded bitstream of the background picture.

Step c. Send background-picture indication information, where the background-picture indication information is used to indicate a time point from which the background picture is used as the reference picture. The background-picture indication information may be background-picture usage delay duration or a background-picture initial usage flag. The indication flag is used to synchronize background picture processing operations on the transmit end and the decoder side. On the encoder side, using the background picture as the reference picture may be understood as using the background picture as the reference picture to encode the to-be-coded video pictures from the time point indicated by the background-picture indication information, that is, the background picture may be selected as a reference picture to encode each to-be-coded picture of the to-be-coded video pictures.

The background-picture usage delay duration is an interval from a time at which the background picture is initially encoded to a time at which the background picture is used as the reference picture for the to-be-coded video pictures. The background-picture usage delay duration may be a pre-configured value of the encoder side or the decoder side, or may be determined by the encoder side and then notified to the decoder side. The encoder side may determine the background-picture usage delay duration based on a current transmission channel bandwidth status and a background-picture compression bitstream size. The decoder side and the encoder side need to cooperate to ensure that transmission of the background-picture bitstream is completed within the time interval.

The background-picture usage delay duration may be represented by using a plurality of methods. The background-picture usage delay duration may be a time interval counted in milliseconds or seconds, a difference between a CVS count of a currently coding picture and a CVS count of a coding picture for which the background picture is initially used, or a difference between a POC (Picture Order Count) of the background picture and a POC of a coding picture for which the background picture is initially used. The POC is a number associated with each compression-coding picture, and the POC is counted based on a playback order of a video picture sequence and may be used to identify each compression-coding picture. The POC is reset at a random access point; therefore, representation by using the POC is applicable to a case in which the background picture is used within a single random access segment. Information about the background-picture usage delay duration may be carried in header information of a coding picture that is adjacent or approximates to the background picture according to an encoding order or a playback order. For example, when reference is made to the H.26x standard, a delay duration field delayed_ref_duration may be added into a slice header of a first slice of the to-be-coded picture, to represent the background-picture usage delay duration. The information about the background-picture usage delay duration may be carried in a SEI message of the to-be-coded picture, for example, if implementation is based on the H.26x standard, new sei_payload delayed_ref_duration may be added into sei_message( ) of the to-be-coded picture, to represent the background-picture usage delay duration. The information about the background-picture usage delay duration may be further carried in a primary bitstream PPS (Picture Parameter Set), for example, if implementation is based on the H.26x standard, a new field delayed_ref_duration may be added into the PPS. The information about the background-picture usage delay duration may be further carried at a location other than the foregoing locations.

The background-picture initial usage flag is sent to the decoder side by the encoder side, to instruct the decoder side to use the background picture as the reference picture to perform a decoding operation on a subsequent to-be-coded picture. Before sending the flag, the encoder side needs to determine that the decoder side has correctly received the background-picture bitstream. This may be implemented by using background-picture bitstream transmission ending feedback information fed back by the decoder side. The background-picture initial usage flag is used to indicate that the background picture may be used as a reference picture for a coding picture that is after the initial usage flag appears. The background-picture initial usage flag may be carried in header information of a coding picture for which the background picture is initially used as the reference picture. For example, if implementation is based on the H.26x standard, a delay duration field delayed_ref_active_flag may be added into a slice header of a first slice of the foregoing coding picture, to represent the background-picture initial usage flag. The background-picture initial usage flag may be carried in a SEI message of the to-be-coded picture, for example, if implementation is based on the H.26x standard, new sei_payload delayed_ref_active_flag may be added into sei_message( ) for the to-be-coded picture, to represent the background-picture initial usage flag. The background-picture initial usage flag may be further carried in a primary bitstream PPS (Picture Parameter Set), for example, if implementation is based on the H.26x standard, a new field delayed_ref_active_flag may be added into the PPS, to represent the background-picture initial usage flag. The background-picture initial usage flag may be further carried at a location other than the foregoing locations.

Step d. Perform a compression encoding operation on to-be-coded video pictures based on the background-picture indication information, to obtain a primary bitstream, and transmit the primary bitstream. This step can be understood as that the background picture is used as the reference picture from the time point indicated by the background-picture indication information, to decode the to-be-coded video pictures, so as to obtain the primary bitstream. To be specific, the background picture may be selected as the reference picture to encode each to-be-coded picture of the to-be-coded video pictures. An encoder starts to use the background picture as the reference picture for the to-be-coded video pictures based on the foregoing background-picture indication information, to perform a compression encoding operation on the to-be-coded video pictures to obtain the primary bitstream. The primary bitstream is transmitted. In this embodiment, starting from the time point indicated by the background-picture indication information means starting from a time indicated by the background-picture usage delay duration or starting after the background-picture initial usage flag is sent. From the time indicated by the background-picture usage delay duration or after the background-picture initial usage flag is sent, a reconstructed background picture may be placed into a DPB of the encoder, and whether the background picture is used as the reference picture may be determined for each to-be-coded picture based on a rate distortion optimization rule. Optionally, a background-picture reference flag may be added into header information of a coding picture, to indicate whether the background picture is used as the reference picture.

The background picture is used as an optional reference picture to encode each to-be-coded picture of the to-be-coded video pictures from the time point indicated by the background-picture indication information, to obtain a coding picture. Whether the background picture is used to encode the to-be-coded picture may be determined by using an encoder side determining mechanism, and the background-picture reference flag in the header information of the coding picture is set based on a determining result. The background-picture reference flag is used to identify whether the background picture is used as a reference picture for a currently coding picture. The encoder side determining mechanism may be set by the encoder side, for example, whether the background picture is used as the reference picture may be determined based on a rate distortion optimization rule.

In this embodiment, the background-picture reference flag in the header information of the coding picture indicates the background picture is not used as the reference picture. That is, if the background picture is not selected as the reference picture for the currently coding picture, an operation of inserting the reconstructed background picture into a reference picture list is not required.

Decoder Side

Step a. Receive the background-picture indication information, the background-picture bitstream, and the primary bitstream, where the primary bitstream includes an encoded bitstream of a video picture encoded by using the background picture as the reference picture.

If the encoder side uses the background-picture usage delay duration as the background-picture indication information, the encoder side needs to complete transmission of the background-picture bitstream within the background-picture usage delay duration, so as to ensure that the decoder side can correctly complete a background picture decoding operation before using the background picture as the reference picture. In addition, no constraint is imposed on an order of transmitting the background-picture bitstream and the primary bitstream.

If the background-picture initial usage flag is used as the background-picture indication information, after correctly receiving the background-picture bitstream, the decoder side sends the background-picture bitstream transmission ending feedback information to the transmit end, to instruct the encoder side to use the background picture as the reference picture for a subsequent to-be-coded picture. When receiving a plurality of background-picture bitstreams, the decoder side sends one piece of feedback information for each background-picture bitstream.

The decoder side may identify the background-picture bitstream based on a newly-added field in a NALU header or a newly-added field in a SEI message, that is, background-picture bitstream identification information. Optionally, the background-picture bitstream may alternatively be identified by using a system layer identifier. A same representation method is agreed to be used for encoder and decoder; therefore, herein, reference may be made to description related to the encoder side.

Step b. Decode the background-picture bitstream to obtain a reconstructed background picture.

A decoding operation is performed on the background-picture bitstream to obtain the reconstructed background picture. It should be noted that the decoding operation needs to be performed after the complete background-picture bitstream is received. There may be a plurality of methods for determining whether the decoder side receives the complete background-picture bitstream, for example, after the time indicated by the background-picture usage delay duration or after the background-picture initial usage flag is received, it may be determined that the decoder side obtains the complete background-picture bitstream. For another example, after a transport layer completes transmission of the background-picture bitstream, the information may be sent to an encoding/decoding layer.

Step c. Perform a decoding operation on the primary bitstream by using the reconstructed background picture as the reference picture based on an indication of the background-picture indication information.

The reconstructed background picture is placed into a DPB of a decoder, and after the time indicated by the background-picture usage delay duration or after the background-picture initial usage flag is received, when a reference picture list of each coding picture is created, the background picture is placed at a preset location, for example, a first location or a last location of a forward reference picture list. It should be noted that an operation of creating the reference picture list needs to be the same as that on the encoder side.

When the reconstructed background picture is used as the reference picture to perform the decoding operation on the primary bitstream, the reconstructed background picture may be used as an optional reference picture for each coding picture in the primary bitstream from the time point indicated by the background-picture indication information, to decode the primary bitstream. Optionally, the encoder side may further add the background-picture reference flag to the header information of the coding picture, to identify whether the background picture is used as the reference picture for the currently coding picture. Therefore, before the operation of creating the reference picture list, the decoder side determines, based on the background-picture reference flag in the header information of the coding picture in the primary bitstream, whether the background picture is used as the reference picture, to decode the currently coding picture. If it is determined that the background picture is used as the reference picture, after an initial reference picture list is created, the background picture is inserted into the reference picture list. If it is determined that the background picture is used as the reference picture, when the reference picture list of the coding picture is created, the background picture is placed at a preset location, for example, a first location or a last location of a forwarded reference picture list.

In this embodiment of the present disclosure, the time point from which the background picture is used as the reference picture is indicated by the background-picture indication information, and the encoder side uses the background picture as the reference picture to perform encoding from the time point indicated by the background-picture indication information. Therefore, time points at which the encoder side and the decoder side use the reference picture can be synchronized by using the background-picture indication information. Based on the synchronization mechanism, the background-picture bitstream can be flexibly transmitted without following a requirement that transmission of the background-picture bitstream should be completed before processing of a next to-be-coded picture. Accordingly, this avoids freeze and wait and a frame drop operation caused by overload of high-quality background picture transmission. In some embodiments of the present disclosure, the background picture is used as the reference picture based on the time point indicated by the background-picture indication information, and the background picture may be used as the reference picture for coding pictures in a plurality of random access segments in encoded video pictures, that is, the background picture can be used cross random access points without being retransmitted.

In some embodiments of the present disclosure, the background-picture indication information is used to indicate a time point from which the background picture may be used as the reference picture for encoding or decoding, and the background-picture indication information is determined based on a current transmission channel bandwidth status and a background-picture compression bitstream size. Therefore, this avoids watching experience deterioration and important information loss that are caused by decoding and playback freeze and wait and a frame drop operation when the background-picture bitstream cannot be transmitted to the receive end in real time because a rate of the background-picture bitstream exceeds a channel transmission capacity.

System Architecture

Figure 6:
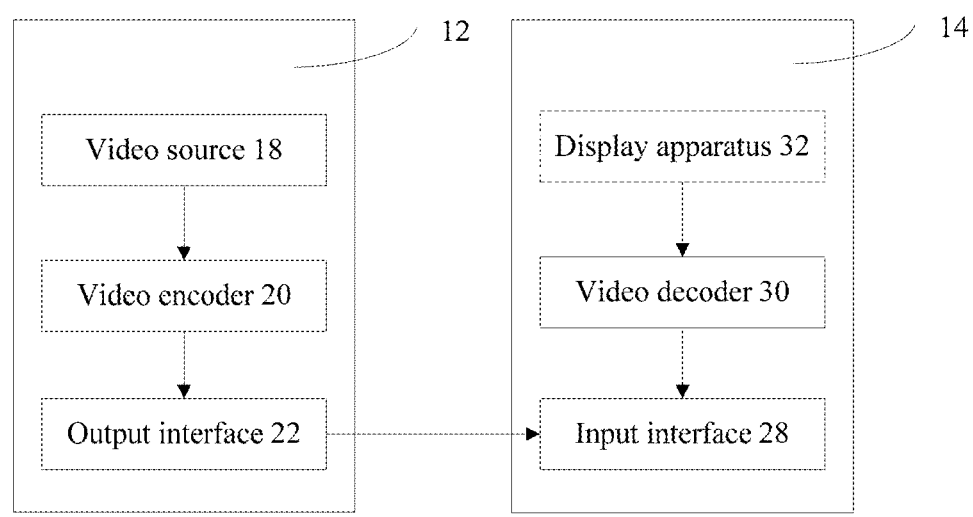
FIG. 6 is a schematic block diagram of a video encoding/decoding system according to an embodiment of the present disclosure.

The encoding/decoding technologies provided in the embodiments of the present disclosure are applicable to a video encoding/decoding system, and may be applicable to various devices with a video capability. FIG. 6 is a schematic block diagram of a video encoding/decoding system 10 according to an embodiment of the present disclosure. As shown in FIG. 6, the video encoding/decoding system 10 includes a source apparatus 12 and a destination apparatus 14.

The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of a video encoding/decoding apparatus or a video encoding/decoding device.

The source apparatus 12 and the destination apparatus 14 may include a wide range of apparatuses with the video capability, including a desktop computer, a mobile computer apparatus, a notebook (such as, laptop) computer, a tablet computer, a set top box, a handhold device such as a smartphone, a television, a camera, a display apparatus, a digital media player, a video game console, an in-vehicle computer, or the like.

The destination apparatus 14 may receive, through a channel 16, the encoded video data from the source apparatus 12. The channel 16 may include one or more media and/or apparatuses that can move the encoded video data from the source apparatus 12 to the destination apparatus 14. For example, the channel 16 may include one or more communications media that make the source apparatus 12 be capable of directly transmitting the encoded video data to the destination apparatus 14 in real time. In this example, the source apparatus 12 may modulate the encoded video data according to a communications standard (such as, a wireless communications protocol), and may transmit modulated video data to the destination apparatus 14. The one or more communications media may include a wireless and/or wired communications medium, such as a radio frequency (RF) spectrum or one or more physical transmission lines. The one or more communications media may form a part of a packet-based network (such as a local area network, a wide area network, or a global network (for example, the Internet)). The one or more communications media may include a router, a switch, a base station, or another device that facilitates communication from the source apparatus 12 to the destination apparatus 14.

In another example, a difference lies in that the channel 16 may include a storage medium that stores the encoded video data generated by the source apparatus 12. In this example, the destination apparatus 14 may access the storage medium through a magnetic disk access or a card access. The storage medium may include a plurality of types of locally-accessed data storage media, such as a Blu-ray disc, DVD, CD-ROM, flash memory, or another suitable digital storage medium that is configured to store the encoded video data.

In another example, the channel 16 may include a file server or another intermediate storage apparatus that stores the encoded video data generated by the source apparatus 12. In this example, the destination apparatus 14 may access, through streaming transmission or downloading, the encoded video data that is stored in the file server or the another intermediate storage apparatus. The file server may be a type of server that can store the encoded video data and transmit the encoded video data to the destination apparatus 14. The example file server includes a web server (for example, a web server used for a website), a File Transfer Protocol (FTP) server, a network-attached storage (NAS) apparatus, and a local disk drive.

The destination apparatus 14 may access the encoded video data through a standard data connection (such as an Internet connection). An example type of data connection includes a wireless channel (for example, a Wi-Fi connection), a wired connection (for example, a DSL and a cable modem), or a combination of both that is suitable for accessing the encoded video data that is stored on the file server. The encoded video data may be transmitted from the file server through streaming transmission, downloading transmission, or a combination of both.

The technologies in the present disclosure are not limited to wireless application scenarios. For example, the technologies may be applied to support video encoding/decoding for a plurality of multimedia applications such as the following applications: over-the-air television broadcasting, cable television transmission, satellite television transmission, streaming transmission video transmission (for example, through the Internet), encoding for video data that is stored on a data storage medium, decoding for video data that is stored on a data storage medium, or another application. In some examples, the video encoding/decoding system 10 may be configured to support one-way or two-way video transmission, to support video streaming transmission, video playback, video broadcasting, and/or a video call, or other application.

In the example of FIG. 6, the source apparatus 12 includes a video source interface 18, a video encoder 20 and an output interface 22. In some examples, the output interface 22 may include a modulator/demodulator (modem) and/or a transmitter. The video source interface 18 may include a video capture apparatus (such as, a video camera), a video archive containing previously captured video data, a video input interface configured to receive video data from a video content provider, and/or a computer graphics system configured to generate video data, or a combination of the foregoing video data sources.

The video encoder 20 may encode video data from the video source interface 18. In some examples, the source apparatus 12 directly transmits the encoded video data to the destination apparatus 14 by using the output interface 22. The encoded video data may be further stored on the storage medium or the file server, so as to be accessed by the destination apparatus 14 later for decoding and/or playback. In the example of FIG. 6, the destination apparatus 14 includes an input interface 28, a video decoder 30, and a display apparatus 32. In some examples, the input interface 28 includes a receiver and/or a modem. The input interface 28 may receive the encoded video data through the channel 16. The display apparatus 32 may be integrated with the destination apparatus 14 or may be disposed outside the destination apparatus 14. Generally, the display apparatus 32 displays decoded video data. The display apparatus 32 may include a plurality of display apparatus, such as a liquid crystal display (LCD), a plasma display, an organic light emitting diode (OLED) display, or another type of display apparatus.

The encoder side in the embodiments of the present disclosure may also be referred to as an encoding device and may be implemented by the source apparatus 12. The source apparatus 12 may be configured to implement the encoding methods in the embodiments of the present disclosure, such as the encoding methods in Embodiment 1 to Embodiment 4. The decoder side in the embodiments of the present disclosure may also be referred to as a decoding device and may be implemented by the destination apparatus 14. The destination apparatus 14 may be configured to implement the decoding methods in the embodiments, such as the decoding methods in Embodiment 1 to Embodiment 4.

The video source interface 18 in the source apparatus 12 is configured to provide to-be-coded video data for the video encoder 20. That is, the video source interface 18 provides the collected video picture sequence or the to-be-coded video pictures mentioned in Embodiment 1 to Embodiment 4, for the video encoder 20.

In different embodiments, the video encoder 20 in the source apparatus 12 may correspondingly perform the methods performed by the encoder side in Embodiment 1 to Embodiment 4. To be specific:

In Embodiment 1 of the present disclosure, the encoder 20 is configured to perform steps a, b, c, and d performed by the encoder side in Embodiment 1.

In Embodiment 2 of the present disclosure, the encoder 20 is configured to perform steps a, b, c, and d performed by the encoder side in Embodiment 2.

In Embodiment 3 of the present disclosure, the encoder 20 is configured to perform steps a, b, c, and d performed by the encoder side in Embodiment 3.

In Embodiment 4 of the present disclosure, the encoder 20 is configured to perform steps a, b, c, and d performed by the encoder side in Embodiment 4.

In Embodiment 1 to Embodiment 4, during implementation in the encoding device, the background-picture bitstream, the primary bitstream, and the background-picture indication information are output by the encoder 20 by using the output interface 22. The background-picture bitstream, the primary bitstream, and the background-picture indication information may be output by the encoder 20 by using the output interface 22 through the channel 16.

Figure 7:
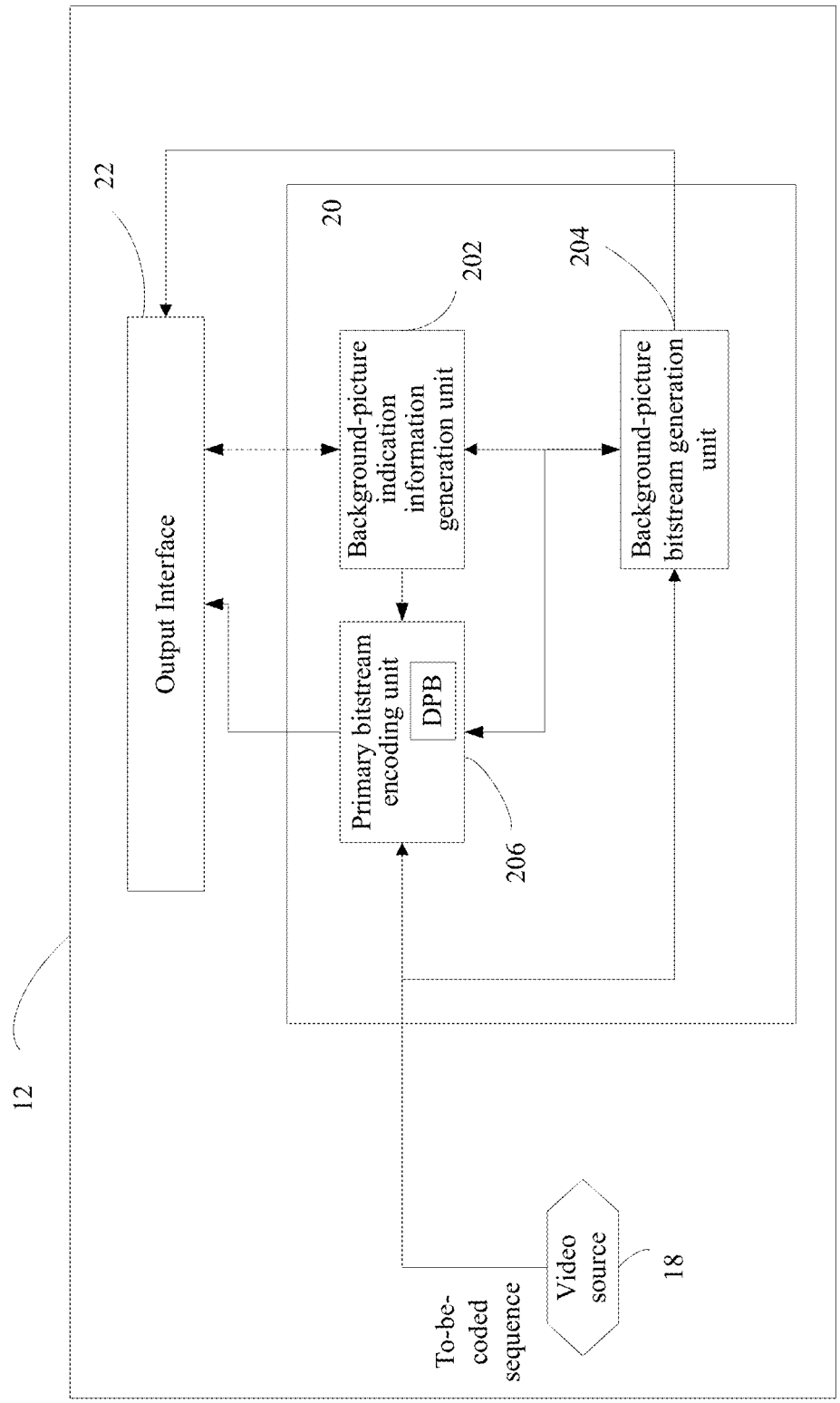
FIG. 7 is a schematic block diagram of a video encoding device according to an embodiment of the present disclosure.

Referring to FIG. 7, in a specific implementation of the source apparatus 12, the encoder 20 includes a primary bitstream encoding unit 206, a background-picture bitstream generation unit 204, and a background-picture indication information generation unit 202. The background-picture bitstream generation unit 204 is configured to perform step a and step b in the embodiments, the background-picture indication information generation unit 202 is configured to perform step c in the embodiments, and the primary bitstream encoding unit 206 is configured to perform step d in the embodiments. When the background-picture indication information generation unit 202 performs the sending background-picture indication information described in this specification, the background-picture indication information generation unit 202 may directly send the background-picture indication information, or may add the background-picture indication information into the primary bitstream, so as to transmit the background-picture indication information with the primary bitstream.

Figure 9:
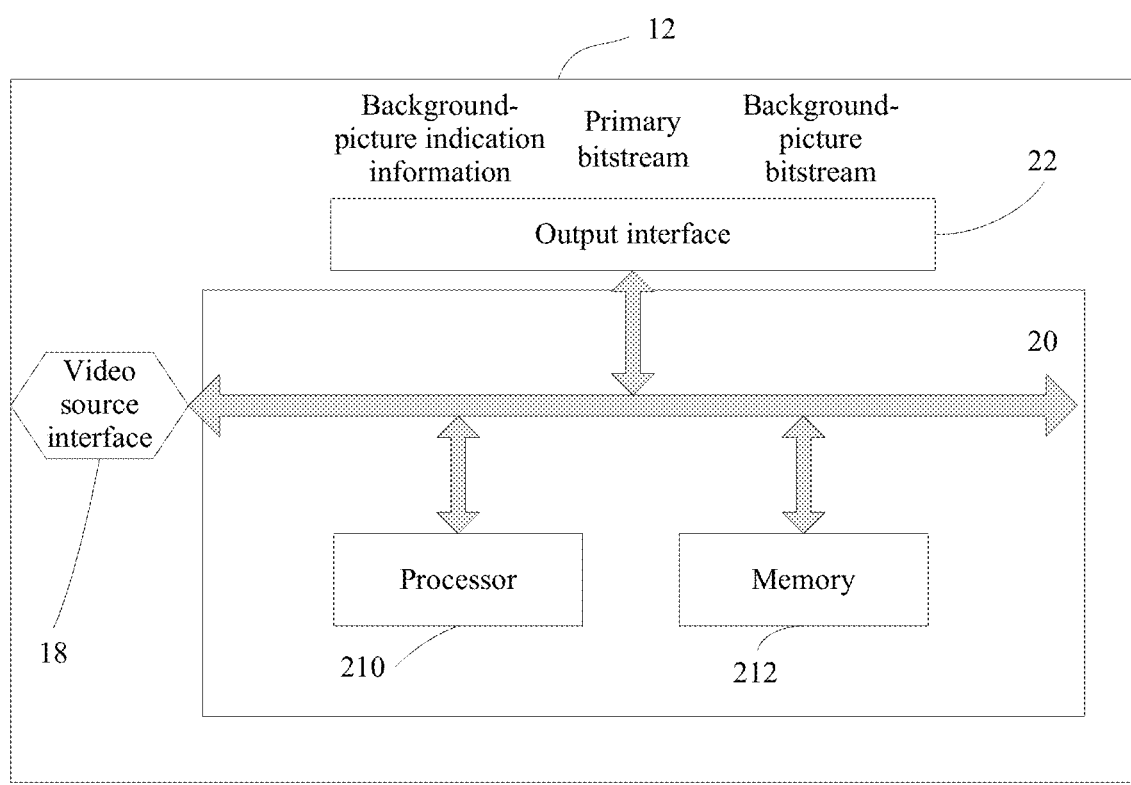
FIG. 9 is a schematic block diagram of another video encoding device according to an embodiment of the present disclosure.

Referring to FIG. 9, in another specific implementation of the source apparatus 12, the encoder 20 may be implemented based on a processor, and the processor reads a computer program instruction from a storage medium, to perform the encoding method performed by the encoder 20 in a corresponding embodiment. This is not repeatedly described herein.

The decoder 30 in the destination apparatus 14 obtains a to-be-decoded compression bitstream by using the input interface 28 from the channel 16. During specific implementation, the decoder 30 obtains, by using the input interface 28, the background-picture bitstream, the primary bitstream, and the background-picture indication information that are mentioned in Embodiment 1 to Embodiment 4.

The video decoder 30 in the destination apparatus 14 may be configured to perform the methods performed by the decoder side in Embodiment 1 to Embodiment 4. To be specific:

In Embodiment 1 of the present disclosure, the decoder 30 is configured to perform steps a, b, and c performed by the encoder side in Embodiment 1.

In Embodiment 2 of the present disclosure, the decoder 30 is configured to perform steps a, b, and c performed by the decoder side in Embodiment 2.

In Embodiment 3 of the present disclosure, the decoder 30 is configured to perform steps a, b, and c performed by the decoder side in Embodiment 3.

In Embodiment 4 of the present disclosure, the decoder 30 is configured to perform steps a, b, and c performed by the decoder side in Embodiment 4.

Figure 8A:
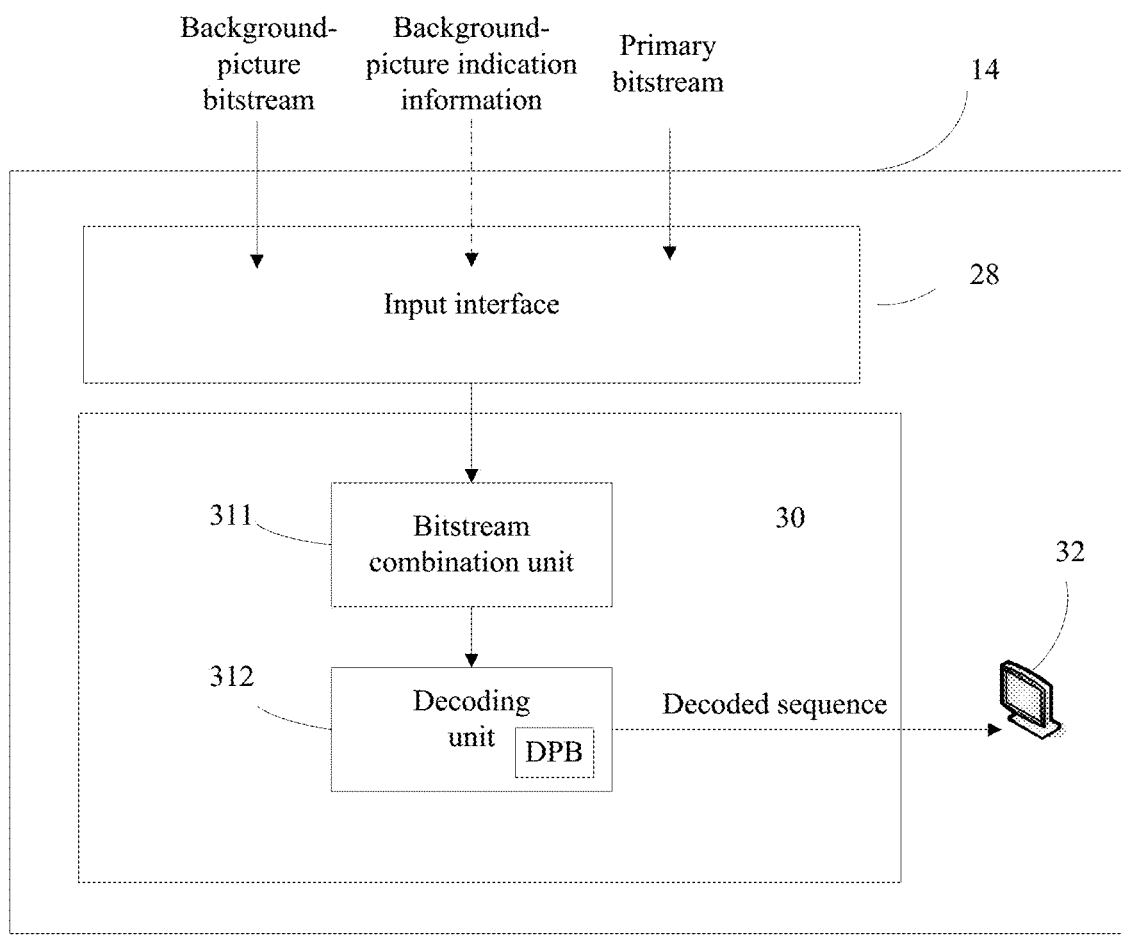
FIG. 8A is a schematic block diagram of a video decoding device according to an embodiment of the present disclosure.

Referring to FIG. 8A, in a specific implementation of the destination apparatus 14, the decoder 30 includes a bitstream combination unit 311 and a decoding unit 312. After receiving, by using the input interface 28, the background-picture bitstream, the background-picture indication information, and the primary bitstream, the bitstream combination unit 311 performs step b performed by the decoder side in Embodiment 1, and the decoding unit 312 performs step c performed by the decoder side in Embodiment 1.

Figure 8B:
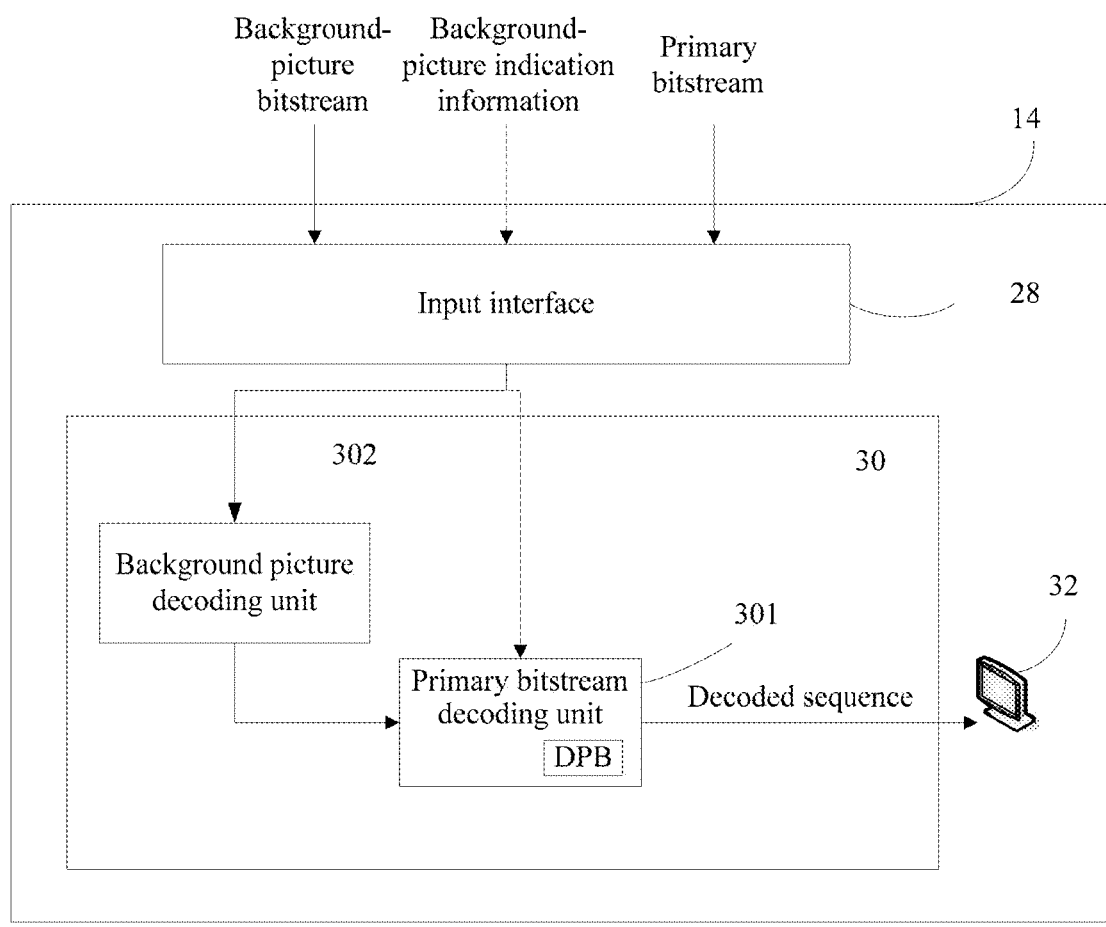
FIG. 8B is a schematic block diagram of a video decoding device according to another embodiment of the present disclosure.

Referring to FIG. 8B, in another specific implementation of the destination apparatus 14, the decoder 30 includes a background picture decoding unit 302 and a primary bitstream decoding unit 301. After receiving, by using the input interface 28, the background-picture bitstream, the background picture decoding unit 302 performs step b of the decoding steps in Embodiment 2 to Embodiment 4. The primary bitstream decoding unit 301 performs a decoding operation on the primary bitstream based on the background-picture indication information and a reconstructed background picture output by the background picture decoding unit 302, that is, the primary bitstream decoding unit 301 performs step c in Embodiment 2 to Embodiment 4. During transmission, a bitstream may first pass through the background picture decoding unit 302 and then pass through the primary bitstream decoding unit 301, or a background picture and a primary bitstream may pass through the background picture decoding unit 302 and the primary bitstream decoding unit 301 respectively (as shown by the dashed line in the figure). This is not limited in this embodiment.

Figure 10:
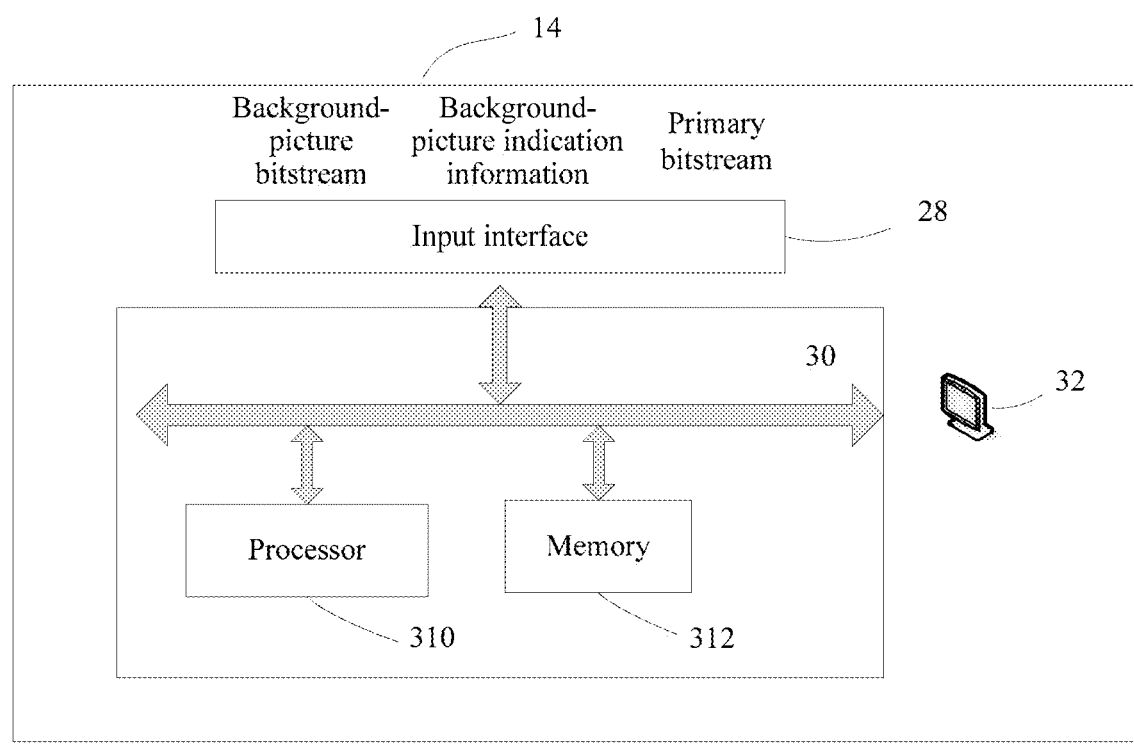
FIG. 10 is a schematic block diagram of another video decoding device according to an embodiment of the present disclosure.

Referring to FIG. 10, in another specific implementation of the destination apparatus 14, the decoder 30 may be implemented based on a processor, and the processor reads a computer program instruction from a storage medium, to perform the steps performed by the decoder 30 in a corresponding embodiment. This is not repeatedly described herein.

The conventional intra-frame or inter-frame compression coding technology mentioned in the embodiments of the present disclosure means that the video encoder 20 and the video decoder 30 may perform an operation according to but not limited to a video compression standard (such as, the High Efficiency Video Coding H.265 standard) and may conform to an HEVC testing model (HM). Text description ITU-TH.265 (V3)(04/2015) of the H.265 standard is published on Apr. 29, 2015, and may be downloaded from http://handle.itu.int/11.1002/1000/12455. The file is incorporated herein by reference in its entirety.

Alternatively, the video encoder 20 and the video decoder 30 may perform an operation according to other proprietary or industry standards, and the standards includes ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264 (also referred to as ISO/IEC MPEG-4 AVC) and includes Scalable Video Coding (SVC) and Multiview Video Coding (MVC) extensions. It should be understood that the technologies in the present disclosure are not limited to any specified encoding/decoding standard or technology.

In addition, the technologies in the present disclosure are applicable to a system that may include only the encoding apparatus or the decoding apparatus, and are applicable to single-side video encoding or decoding in any digital communication. In another example, data is retrieved from a local memory and is transmitted through network streaming, or data is operated in a similar manner. The encoding apparatus may encode data and store the data in a memory, and/or the decoding apparatus may retrieve data from the memory and decode the data. In a plurality of examples, encoding and decoding are performed by a plurality of apparatuses that do not communicate with each other but only encode data and store data in the memory and/or retrieve data from the memory and decode the data.

The video encoder 20 and the video decoder 30 each may be implemented as any one of a plurality of suitable circuits, such as one or more microprocessors, digital signal processors (DSP), application specific integrated circuits (ASICs), and field programmable gate arrays (FPGAs), discrete logic, hardware, or any combination thereof. When the technologies are implemented partially or entirely in software, an apparatus may store an instruction of the software in a suitable non-transitory computer readable storage medium and may execute, by using one or more processors, an instruction in hardware, to perform the technologies of the present disclosure. Any one of the above-mentioned (including the hardware, the software, the combination of hardware and software, and the like) may be regarded as one or more processors. Either of the video encoder 20 and the video decoder 30 may be included in one or more encoders or decoders, and may be integrated as a part of a combined encoder/decoder (codec (CODEC)) in another apparatus.

The video encoder 20 "sends, by using a signal", or "transmit" a piece of information to another apparatus (for example, the video decoder 30). The terms "sending by using a signal" or "transmitting" may generally indicate transmission of a syntactic element and/or encoded video data. The transmission may occur in real time or nearly in real time. Alternatively, the communication may occur in a time span, for example, may occur when a syntactic element is stored, by using binary data obtained after encoding, on a computer readable storage medium during encoding. After being stored on the medium, the syntactic element may then be retrieved by the decoding apparatus at any time.

In one or more examples, the described functions may be implemented in hardware, software, firmware, or any combination thereof. If being implemented in software, the functions may be stored on a computer readable medium or transmitted by using a computer readable medium as one or more instructions or code, and may be executed by using a hardware-based processing unit. The computer readable medium may include a computer readable storage medium (which is corresponding to a tangible medium such as a data storage medium) or a communications medium. The communications medium includes (for example) any medium that facilitates, according to a communications protocol, transmission of a computer program from one location to another location. In this manner, the computer readable medium may be generally corresponding to (1) a non-transitory tangible computer readable storage medium or (2) a communications medium such as a signal or a carrier. The data storage medium may be any applicable medium that can be accessed by one or more computers or one or more processors and that is in a structure of a retrieve instruction, code, and/or data and is configured to implement the technologies described in the embodiments of the present disclosure. A computer program product may include the computer readable medium.

In an example but not as a limitation, some computer readable storage media may include a RAM, a ROM, an EEPROM, a CD-ROM, or another optical disc memory, a magnetic memory or another magnetic storage apparatus, a flash memory, or any other medium that can be configured to store desired program code in a form of instructions or data structures and that is accessible by a computer. Any connection may be suitably referred to as the computer readable medium. For example, if an instruction is sent from a website, a server or another remote source by using a coaxial cable, an optical cable, a twisted pair, a digital subscriber line (DSL) or wireless technologies (such as infrared ray, radio, and microwave), the coaxial cable, optical cable, twisted pair, DSL, or wireless technologies (such as infrared ray, radio, and microwave) are included in definitions of the medium. However, it should be understood that the computer readable storage medium and the data storage medium do not include a connection, a carrier, a signal, or any other transitory medium, but are related to a non-transitory tangible storage medium. A disk and a disc used in this specification include a compact disc (CD), a laser disc, an optical disc, a digital versatile disc (DVD), a floppy disk, and a Blue-ray disc. The disk generally copies data magnetically, and the disc copies data optically by using laser. A combination of the foregoing objects should also be included in a range of the computer readable medium.

For example, an instruction may be executed by one or more processors, such as one or more digital signal processors (DSPs), general purpose microprocessors, application specific integrated circuits (ASICs), field programmable gate arrays (FPGAs), or other equivalent logic circuits or discreet logic circuits. Therefore, the term "processor" used in this specification may represent any one of the foregoing structures or another structure that is applicable to implement the technologies described in this specification. In addition, in some aspects, functions described in this specification may be provided in a special-purpose hardware and/or software module that is configured for encoding and decoding, or may be integrated to a codec. In addition, the technologies may be completely implemented in one or more circuits or logic elements.

The technologies of the present disclosure may be widely implemented by a plurality of types of apparatuses or devices. The apparatuses or devices include a wireless handheld device, an integrated circuit (IC), or an IC set (such as a chip set). Various components, modules, or units are described in the present disclosure to emphasize functional aspects of apparatuses configured to perform the disclosed technologies, but do not necessarily require realization by using different hardware units. To be specific, as described above, various units may be combined in a codec hardware unit or provided by a collection of interoperative hardware units (including one or more processors as described above) in conjunction with suitable software and/or firmware.

It should be understood that "one embodiment" or "an embodiment" mentioned in the whole specification means that particular features, structures, or characteristics related to the embodiment are included in at least one embodiment of the present disclosure. Therefore, "in one embodiment" or "in an embodiment" that appears throughout the whole specification does not necessarily mean a same embodiment. Moreover, the particular characteristic, structure or property may be combined in one or more embodiments in any proper manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only; that is, B may also be determined based on A and/or other information.

Persons of ordinary skill in the art may be aware that, the units and steps in the examples described with reference to the embodiments disclosed herein may be implemented by electrical hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of the present disclosure may be integrated into one processing unit, or each of the units may exist alone physically, or two or more units are integrated into one unit.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A video decoding method, performed by a decoder side, wherein the method comprises:
   receiving background-picture indication information, a background-picture bitstream, and a primary bitstream, wherein:
      the background-picture bitstream comprises a bitstream obtained by encoding a background picture,
      the background-picture indication information indicates a time point from which the background picture is used as a reference picture, wherein the background-picture indication information is background-picture usage delay that is represented by either:
         (1) a difference between a coded video sequence CVS (Coded Video Sequence) count of a currently coding picture and a CVS count of a coding picture for which the background picture is initially used; or
         (2) a difference between a POC (Picture Order Count) of the background picture and a POC of a coding picture for which the background picture is initially used, wherein the POC is a number associated with each compression-coding picture, and the POC is counted based on a playback order of a video picture sequence and may be used to identify each compression-coding picture, and
      the primary bitstream comprises a coding picture of a video picture encoded using the background picture as the reference picture; and
   decoding the primary bitstream using the background picture as the reference picture from a time indicated by the background-picture usage delay duration, comprising:
      from the time indicated by the background-picture usage delay duration, determining, based on a background-picture reference flag in header information of each coding picture in the primary bitstream, whether the background picture is used as the reference picture for the currently coding picture; and
      in response to determining that the background picture is used as the reference picture, creating an initial reference picture list, and then inserting the background picture into the reference picture list.

2. The video decoding method according to claim 1, wherein the primary bitstream comprises at least one random access segment, and
   wherein the decoding the primary bitstream using the background picture as the reference picture from the time indicated by the background-picture usage delay duration comprises:
      decoding the primary bitstream using the background picture as the reference picture for each random access segment in the primary bitstream from the time indicated by the background-picture usage delay duration.

3. The video decoding method according to claim 2, wherein the decoding the primary bitstream using the background picture as a reference picture for each random access segment in the primary bitstream from the time indicated by the background-picture usage delay duration comprises:
   decoding the background-picture bitstream to obtain a reconstructed background picture; and
   decoding the primary bitstream using the reconstructed background picture as the reference picture for each random access segment in the primary bitstream from the time indicated by the background-picture usage delay duration.

4. The video decoding method according to claim 2, wherein the decoding the primary bitstream using the background picture as a reference picture for each random access segment in the primary bitstream from the time indicated by the background-picture usage delay duration comprises:
   inserting the background-picture bitstream into a start location of each random access segment in the primary bitstream from the time indicated by the background-picture usage delay duration, to obtain a combined bitstream; and
   decoding the combined bitstream.

5. The video decoding method according to claim 1, wherein the background-picture bitstream is a high-quality background-picture bitstream that is independently encoded, and
   wherein the decoding the primary bitstream using the background picture as the reference picture from the time indicated by the background-picture usage delay duration comprises:
      decoding the background-picture bitstream to obtain a high-quality background picture; and
      after the time indicated by the background picture usage delay duration, identifying a corresponding conventionally-coded background picture that is in a Decoding Picture Buffer (DPB);
   replacing the conventionally-coded background picture with the high-quality background picture; and
   decoding the primary bitstream using the high-quality background picture as the reference picture, wherein picture quality of the high-quality background picture is higher than picture quality of the conventionally-coded background picture.

6. The video decoding method according to claim 1, wherein the decoding the primary bitstream using the background picture as the reference picture from the time point indicated by the background-picture indication information comprises:

decoding the primary bitstream using the background picture as an optional reference picture for each coding picture in the primary bitstream from the time point indicated by the background-picture indication information.

7. The video decoding method according to claim 1, wherein the background-picture usage delay duration is an interval from a time at which the background picture is initially encoded to a time at which the background picture is used as a reference picture for to-be-coded video pictures.

8. The video decoding method according to claim 7, wherein information about the background-picture usage delay duration is carried in header information of the background picture or set in a SEI (Supplemental Enhancement Information) message or a PPS (Picture Parameter Set).

9. A video decoder, wherein the decoder comprises:
a background picture decoder configured to:
receive a background-picture bitstream, wherein the background-picture bitstream comprises a bitstream obtained by encoding a background picture; and
decode the background-picture bitstream to obtain a reconstructed background picture; and
a primary bitstream decoder configured to:
receive a primary bitstream and background-picture indication information, wherein:
the background-picture indication information indicates a time point from which the background picture is used as a reference picture, wherein the background-picture indication information is background-picture usage delay information that is represented by either:
(1) a difference between a coded video sequence CVS (Coded Video Sequence) count of a currently coding picture and a CVS count of a coding picture for which the background picture is initially used; or
(2) a difference between a POC (Picture Order Count) of the background picture and a POC of a coding picture for which the background picture is initially used, wherein the POC is a number associated with each compression-coding picture, and the POC is counted based on a playback order of a video picture sequence and may be used to identify each compression-coding picture; and
the primary bitstream comprises a coding picture of a video picture encoded using the background picture as the reference picture; and
decode the primary bitstream using the background picture as the reference picture from a time indicated by the background-picture usage delay duration, wherein header information of each coding picture in the primary bitstream comprises a background-picture reference flag, and the primary bitstream decoder is configured to:
from the time indicated by the background-picture usage delay duration, determine, based on the background-picture reference flag in the header information of each coding picture in the primary bitstream, whether the background picture is used as the reference picture for the currently coding picture; and
in response to determining that the background picture is used as the reference picture, create an initial reference picture list, and then insert the background picture into the reference picture list.

10. The video decoder according to claim 9, wherein:
the background-picture bitstream is a high-quality background-picture bitstream that is independently encoded,
the background picture decoder is configured to decode the background-picture bitstream to obtain a high-quality background picture, and
the primary bitstream decoder is configured to:
from a time point indicated by the background picture, identify a corresponding conventionally-coded background picture that is in a Decoding Picture Buffer (DPB);
replace the conventionally-coded background picture with the high-quality background picture; and
decode the primary bitstream using the high-quality background picture as the reference picture, wherein picture quality of the high-quality background picture is higher than picture quality of the conventionally-coded background picture.

11. The video decoder according to claim 9, wherein the primary bitstream decoder is configured to:
receive the primary bitstream and the background-picture indication information; and
decode the primary bitstream using the background picture as an optional reference picture for each coding picture in the primary bitstream from the time indicated by the background-picture usage delay duration.

12. The video decoder according to claim 9, wherein the primary bitstream comprises one or more random access segments, and the primary bitstream decoder decodes the primary bitstream using the background picture as the reference picture for each random access segment in the primary bitstream from the time indicated by the background-picture usage delay duration.

13. The video decoder according to claim 9, wherein the background-picture usage delay duration is an interval from a time at which the background picture is initially encoded to a time at which the background picture is used as a reference picture for to-be-coded video pictures.

14. The video decoder according to claim 9, wherein information about the background-picture usage delay duration is carried in header information of the coding picture in the primary bitstream or set in a SEI (Supplemental Enhancement Information) message or a PPS (Picture Parameter Set).

15. A video decoding method, performed by a decoder side, wherein the method comprises:
receiving background-picture indication information, a background-picture bitstream, and a primary bitstream, wherein:
the background-picture bitstream comprises a bitstream obtained by encoding a background picture;
the background-picture indication information indicates a time point from which the background picture is used as a reference picture, wherein the background-picture indication information is a background-picture initial usage flag; and
the primary bitstream comprises a coding picture of a video picture encoded using the background picture as the reference picture;
sending feedback information to an encoder side after completing receiving the background-picture bitstream, wherein:

the feedback information indicates that transmission of the background-picture bitstream ends; and receiving background-picture indication information comprises receiving the background-picture initial usage flag from the encoder side after the feedback information is sent; and decoding the primary bitstream using the background picture as the reference picture from a time at which the background-picture initial usage flag appears.

16. A video decoder, wherein the decoder comprises:

a background picture decoder configured to:
  receive a background-picture bitstream, wherein the background-picture bitstream comprises a bitstream obtained by encoding a background picture; and
  decode the background-picture bitstream to obtain a reconstructed background picture; and a primary bitstream decoder configured to:
  receive a primary bitstream and background-picture indication information, wherein:
    the background-picture indication information indicates a time point from which the background picture is used as a reference picture, wherein the background-picture indication information is a background-picture initial usage flag; and
  the primary bitstream comprises a coding picture of a video picture encoded using the background picture as the reference picture;
  send feedback information to an encoder side after completing receiving the background-picture bitstream, wherein:
    the feedback information indicates that transmission of the background-picture bitstream ends; and
    receiving background-picture indication information comprises receiving the background-picture initial usage flag from the encoder side after the feedback information is sent; and
  decode the primary bitstream using the background picture as the reference picture from a time at which the background-picture initial usage flag appears.

* * * * *